United States Patent
Guo et al.

(10) Patent No.: US 12,219,636 B2
(45) Date of Patent: Feb. 4, 2025

(54) MULTI-LINK COMMUNICATION PROBE REQUEST METHOD AND APPARATUS

(71) Applicant: HUAWEI TECHNOLOGIES CO., LTD., Guangdong (CN)

(72) Inventors: Yuchen Guo, Shenzhen (CN); Ming Gan, Shenzhen (CN); Yunbo Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/309,776

(22) Filed: Apr. 29, 2023

(65) Prior Publication Data

US 2023/0269807 A1 Aug. 24, 2023

Related U.S. Application Data

(63) Continuation of application No. PCT/CN2021/099707, filed on Jun. 11, 2021.

(30) Foreign Application Priority Data

Nov. 5, 2020 (CN) .......................... 202011225134.5
Nov. 24, 2020 (CN) .......................... 202011333550.7

(51) Int. Cl.
*H04W 4/00* (2018.01)
*H04W 76/11* (2018.01)
*H04W 76/15* (2018.01)

(52) U.S. Cl.
CPC ............ *H04W 76/15* (2018.02); *H04W 76/11* (2018.02)

(58) Field of Classification Search
CPC .............................. H04W 76/15; H04W 76/11
See application file for complete search history.

(56) References Cited

U.S. PATENT DOCUMENTS

| 2020/0221545 A1 | 7/2020 | Stacey et al. |
| 2023/0156840 A1* | 5/2023 | Chitrakar ............. H04B 17/309 370/329 |
| 2023/0217271 A1* | 7/2023 | Kim ...................... H04W 24/02 370/329 |

FOREIGN PATENT DOCUMENTS

| CN | 110199494 A | 9/2019 |
| CN | 111066271 A | 4/2020 |

(Continued)

OTHER PUBLICATIONS

Namyeong Kim (LG Electronics): "PDT-MAC-MLO-Discovery-Information-Request", IEEE Draft; 11-20-1667-00-00BE-PDT-MAC-MLO-Discovery-Information-Request, IEEE-SA Mentor, Piscataway, NJ USA vol. 802.11 EHT; 802.11be, Oct. 17, 2020 (Oct. 17, 2020), pp. 1-3, XP068173844.

(Continued)

*Primary Examiner* — Omoniyi Obayanju

(57) ABSTRACT

This application discloses a multi-link communication probe request method and apparatus. The method includes: a non-access point multi-link device (non-AP MLD) generates a probe request frame, and sends the probe request frame to an access point multi-link device (AP MLD), and the AP MLD receives the probe request frame, and generates a probe response frame and sends to the non-AP MLD. The probe request frame includes a first multi-link element (MLE) that is used to request link information of the AP MLD and that includes a first link information field. The first link information field includes a first field. The first field indicates that the non-AP MLD requests the AP MLD to feed back complete information or partial information of a first link. The first link information field corresponds to the first link.

22 Claims, 26 Drawing Sheets

(56) References Cited

FOREIGN PATENT DOCUMENTS

| CN | 111417171 A | 7/2020 |
|----|----|----|
| CN | 111683413 A | 9/2020 |
| CN | 111741459 A | 10/2020 |
| CN | 110521178 B | 3/2021 |
| WO | 2016010987 A1 | 1/2016 |

OTHER PUBLICATIONS

Jason Yuchen Guo (Huawei Technologies Co Ltd): "Multi-Link Probe Request Design", IEEE Draft; 11-20-1396-01-00BE-Multi-Link-Probe-Reques t-Design, IEEE-SA Mentor, Piscataway, NJ, USA, vol. 802.11 EHT; 802.11be, No. 1, Oct. 14, 2020 (Oct. 14, 2020), pp. 1-15, XP068173797.
Laurent Cariou (Intel) :PDT-TBDs-MAC-MLO Discovery-Discovery procedures including probing and RNR, IEEE Draft; 11-20-1651-00-00BE-PDT-TBDS-MAC-MLO-Discovery-Discovery-Procedures-Including-Probing-And-RNR, IEEE-SA Mentor, Piscataway, NJ, USA vol. 802.11 EHT; 802.11be, Oct. 14, 2020, (Oct. 14, 2020),pp. 1-6, XP068173798.
Laurent Cariou (Intel):"Pdt-TBDS-MAC-MLO Discovery—Discovery procedures including probing and RNR" IEEE Draft; 11-20-1651-01-00BE-PDT-TBDS-MAC-MLO-Discovery-Discovery-Procedures-Including-Probing-And-RNR, IEEE-SA Mentor, Piscataway, NJ, USA, vol. 802.11 EHT; 802.11be, Oct. 21, 2020, (Oct. 21, 2020), pp. 1-6, XP068173919.

\* cited by examiner

MULTI-LINK COMMUNICATION PROBE REQUEST METHOD AND APPARATUS

CROSS-REFERENCE TO RELATED APPLICATIONS

This application is a continuation of International Application No. PCT/CN2021/099707, filed on Jun. 11, 2021, which claims priorities to Chinese Patent Application No. 202011225134.5, filed on Nov. 5, 2020 and Chinese Patent Application No. 202011333550.7, filed on Nov. 24, 2020. All of the aforementioned patent applications are hereby incorporated by reference in their entireties.

TECHNICAL FIELD

This application relates to the field of communication technologies, and in particular, to a multi-link communication probe request method and apparatus.

BACKGROUND

With development of wireless communication technologies, more wireless communication devices support multi-link communication, for example, simultaneous communication in the 2.4 GHz, 5 GHz, and 6 GHz bands, or simultaneous communication over different channels in a same band. This communication method can improve communication efficiency between wireless communication devices. In addition, the wireless communication device is usually referred to as a multi-link device (multi-link device, MLD).

The multi-link device may be an access point device, or a station device. If the multi-link device is an access point device, the multi-link device includes one or more access points (access points, APs). If the multi-link device is a station device, the multi-link device includes one or more non-access point stations (non-access point stations, non-AP STAs). The one or more non-AP STAs in the station device and the one or more APs in the access point device may communicate after establishing an association relationship. For example, to discover existence of the AP, the STA may initiate an active scanning process. For example, the STA may send a probe request frame (probe request frame), and the AP may reply with a probe response frame (probe response frame) after receiving the probe request frame. The probe response frame may carry related information of the AP, so that the STA probes the AP and obtains various parameter information of the AP.

However, in the foregoing communication process, how to allow the AP to accurately learn information required by the STA needs to be urgently resolved.

SUMMARY

This application provides a multi-link communication probe request method and apparatus, to allow a non-AP MLD to clearly indicate information required by the non-AP MLD, and to allow an AP MLD to accurately feed back the information required by the non-AP MLD. This improves information exchange efficiency.

According to a first aspect, an embodiment of this application provides a multi-link communication probe request method. The method includes:

A non-access point multi-link device (non-AP multi-link device, non-AP MLD) generates a probe request frame (probe request frame), where the probe request frame includes a first multi-link element (multi-link element, MLE), the first multi-link element is used to request link information of an access point multi-link device (AP multi-link device, AP MLD), the first multi-link element includes a first link information field, the first link information field includes a first field, the first field indicates that the non-AP MLD requests the AP MLD to feed back complete information or partial information of a first link, and the first link information field corresponds to the first link; and the non-AP MLD sends the probe request frame to the AP MLD.

According to a second aspect, an embodiment of this application provides a multi-link communication probe request method. The method includes:

An access point multi-link device (AP MLD) receives a probe request frame, where the probe request frame includes a first multi-link element, the first multi-link element is used to request link information of the AP MLD, the first multi-link element includes a first link information field, the first link information field includes a first field, the first field indicates that a non-access point multi-link device (non-AP MLD) requests the AP MLD to feed back complete information or partial information of a first link, and the first link information field corresponds to the first link; and the AP MLD generates a probe response frame based on the probe request frame, and sends the probe response frame to the non-AP MLD.

The first link information field corresponds to the first link because the first link information field further includes a link identifier (link identifier, link ID) field, and the link identifier field may indicate an identifier of the first link. The first link information field may also be referred to as a first per-STA profile (per-STA profile) field. In other words, a link information field may also be referred to as a per-STA profile field. In addition, the first field may also be referred to as a first subfield or the like. A specific name of each field is not limited in this embodiment of this application.

In this embodiment of this application, the first field indicates that the non-AP MLD requests the AP MLD to feed back the complete information or the partial information of the first link, so that the non-AP MLD can clearly indicate which one of the complete information and the partial information of the link is fed back by the AP MLD, and the AP MLD accurately learns of the link information that needs to be fed back by the AP MLD. This improves information exchange efficiency.

In any possible implementation of the first aspect or the second aspect, the first field is a complete information (complete information) field in the first link information field.

Generally, when a value of the complete information field is a fixed value, the link information field may indicate that the non-AP MLD carries the complete information of the first link. However, in this embodiment of this application, the first multi-link element is used to request the link information of the AP MLD. In this case, signaling overheads can be reduced by reusing the complete information field.

In any possible implementation of the first aspect or the second aspect, the first multi-link element further includes a first multi-link control (multi-link control) field. The first multi-link control field includes first type information. The first type information indicates a type of the first multi-link element.

In this embodiment of this application, the first type information may explicitly indicate the type of the first multi-link element, so that the AP MLD clearly learns of a function of the first multi-link element. This further improves information exchange efficiency.

In any possible implementation of the first aspect or the second aspect, when a value of the first field is a first value, the first field indicates that the non-AP MLD requests the AP MLD to feed back the complete information of the first link; or when a value of the first field is a second value, the first field indicates that the non-AP MLD requests the AP MLD to feed back the partial information of the first link.

In this embodiment of this application, the specific value of the first field may be set to further determine which one of the complete information and the partial information of the first link is fed back by the AP MLD.

In any possible implementation of the first aspect or the second aspect, the probe request frame further includes a second multi-link element. The second multi-link element indicates link information of the non-AP MLD.

In this embodiment of this application, the probe request frame may include only one type of multi-link element, for example, the first multi-link element. Alternatively, the probe request frame may include two types of multi-link elements, for example, the first multi-link element and the second multi-link element. The multi-link elements of distinguished types may be more flexibly selected by the non-AP MLD.

In any possible implementation of the first aspect or the second aspect, the second multi-link element includes a second link information field. The second link information field corresponds to a second link. The second link information field includes a second field. The second field indicates that the non-AP MLD carries complete information or partial information of the second link. The second link information field corresponds to the second link.

In any possible implementation of the first aspect or the second aspect, the second field is a complete information field in the second link information field.

In any possible implementation of the first aspect or the second aspect, the second multi-link element further includes a second multi-link control (multi-link control) field. The second multi-link control field includes second type information. The second type information indicates a type of the second multi-link element.

In any possible implementation of the first aspect or the second aspect, the first field is a request complete information (request complete information) field in the first link information field.

According to a third aspect, an embodiment of this application provides a multi-link communication probe request method. The method includes:

A non-access point multi-link device (non-AP MLD) generates a probe request frame, where the probe request frame includes at least one multi-link element, the multi-link element includes a multi-link control (multi-link control) field, the multi-link control field includes a third field, when a value of the third field is a third value, the multi-link element is used to request link information of an access point multi-link device (AP MLD), or when a value of the third field is a fourth value, the multi-link element indicates link information of the non-AP MLD; and the non-AP MLD sends the probe request frame to the AP MLD.

According to a fourth aspect, an embodiment of this application provides a multi-link communication probe request method. The method includes:

An access point multi-link device (AP MLD) receives a probe request frame, where the probe request frame includes at least one multi-link element, each multi-link element includes a multi-link control field, the multi-link control field includes a third field, when a value of the third field is a third value, the multi-link element is used to request link information of the AP MLD, or when a value of the third field is a fourth value, the multi-link element indicates link information of a non-access point multi-link device (non-AP MLD); and the AP MLD generates a probe response frame based on the probe request frame, and sends the probe response frame to the non-AP MLD.

In this embodiment of this application, the multi-link element is used to request the link information of the AP MLD. In other words, a type of the multi-link element is an MLD probing (probing) type, or is referred to as an MLD probe request (MLD probe request) type. The multi-link element indicates the link information of the non-AP MLD. In other words, a type of the multi-link element is a basic (basic) type. This description is also applicable in the following.

In any possible implementation of the third aspect or the fourth aspect, the multi-link element further includes a link information field. The link information field includes a fourth field. When the multi-link element is used to request the link information of the AP MLD, the fourth field indicates that the non-AP MLD requests the AP MLD to feed back complete information or partial information of a first link, where the first link corresponds to the link information field; or when the multi-link element is used to indicate the link information of the non-AP MLD, the fourth field indicates that the non-AP MLD carries complete information or partial information of a first link.

In any possible implementation of the third aspect or the fourth aspect, when a value of the fourth field is a first value, the fourth field indicates that the non-AP MLD requests the AP MLD to feed back the complete information of the first link; or when a value of the fourth field is a second value, the fourth field indicates that the non-AP MLD requests the AP MLD to feed back the partial information of the first link.

In any possible implementation of the third aspect or the fourth aspect, the fourth field is a complete information field in the link information field.

It may be understood that for beneficial effects of the third aspect or the fourth aspect, refer to the foregoing descriptions of the first aspect or the second aspect. Details are not described herein again.

According to a fifth aspect, an embodiment of this application provides a multi-link communication probe request method. The method includes:

A non-access point multi-link device (non-AP MLD) generates a probe request frame, where the probe request frame includes a multi-link element, the multi-link element includes a link information field, if the link information field does not include a fifth field, the link information field indicates that the non-AP MLD requests an access point multi-link device (AP MLD) to feed back complete information of a first link, and the link information field corresponds to the first link; and the non-AP MLD sends the probe request frame to the AP MLD.

According to a sixth aspect, an embodiment of this application provides a multi-link communication probe request method. The method includes:

An access point multi-link device (AP MLD) receives a probe request frame, where the probe request frame includes a multi-link element, the multi-link element includes a link information field, if the link information field does not include a fifth field, the link information field indicates that a non-access point multi-link device (non-AP MLD) requests the AP MLD to feed back complete information of a first link, and the link information field corresponds to the first link; and the AP MLD generates a probe response frame based on the probe request frame, and sends the probe response frame to the non-AP MLD.

Generally, if the link information field does not include the fifth field, the link information field may indicate that the non-AP MLD requests the AP MLD to feed back the complete information of the first link, or may indicate that one or more information elements in the link information field are the same as one or more information elements on a transmitting link. In this case, the AP MLD may not accurately learn of which one of the complete information and partial information of the first link needs to be fed back.

However, in this embodiment of this application, the link information field indicates that the non-AP MLD requests the AP MLD to feed back the complete information of the first link. In other words, the link information field may not indicate that an information element in the link information field is the same as an information element on a transmitting link.

Therefore, the AP MLD may accurately learn that the complete information of the first link is fed back. This improves information exchange efficiency.

In any possible implementation of the fifth aspect or the sixth aspect, the multi-link element further includes a third field. A value of the third field is a third value. The multi-link element is used to request link information of the AP MLD.

In any possible implementation of the fifth aspect or the sixth aspect, the fifth field includes a request element (request element) field and an extended request element (extended request element) field.

According to a seventh aspect, an embodiment of this application provides a multi-link communication probe request method. The method includes:

A non-access point multi-link device (non-AP MLD) generates a probe request frame, where the probe request frame includes a link information field, the link information field includes a sixth field, the sixth field indicates whether the non-AP MLD requests link information of a first link, and the link information field corresponds to the first link; and the non-AP MLD sends the probe request frame to an access point multi-link device (AP MLD).

According to an eighth aspect, an embodiment of this application provides a multi-link communication probe request method. The method includes:

An access point multi-link device (AP MLD) receives a probe request frame, where the probe request frame includes a link information field, the link information field includes a sixth field, the sixth field indicates whether a non-access point multi-link device (non-AP MLD) requests link information of a first link, and the link information field corresponds to the first link; and the AP MLD generates a probe response frame based on the probe request frame, and sends the probe response frame to the non-AP MLD.

In this embodiment of this application, the sixth field is added to the link information field, so that the non-AP MLD can clearly indicate whether the AP MLD probes a link (for example, the first link). In other words, the non-AP MLD may flexibly select a link as a probe request object, to avoid that the AP MLD probes the link (for example, the first link) again. This avoids resource waste.

In any possible implementation of the seventh aspect or the eighth aspect, when a value of the sixth field is a fifth value, the sixth field indicates that the non-AP MLD requests the link information of the first link; or when a value of the sixth field is a sixth value, the sixth field indicates that the non-AP MLD does not request the link information of the first link.

In other words, when the value of the sixth field is the fifth value, the sixth field indicates that the non-AP MLD requests the AP MLD to feed back the link information of the first link; or when the value of the sixth field is the sixth value, the sixth field indicates that the non-AP MLD requests the AP MLD not to feed back the link information of the first link.

According to a ninth aspect, an embodiment of this application provides a communication apparatus, configured to perform the method in any one of the first aspect, the third aspect, the fifth aspect, the seventh aspect, or the possible implementations thereof. The communication apparatus includes corresponding units, configured to perform the method in any one of the first aspect, the third aspect, the fifth aspect, the seventh aspect, or the possible implementations thereof.

For example, the communication apparatus may include a transceiver unit and a processing unit. The communication apparatus may be the non-AP MLD in the first aspect, the third aspect, the fifth aspect, or the seventh aspect, or a chip in the non-AP MLD, for example, a wireless fidelity (wireless fidelity, Wi-Fi) chip.

According to a tenth aspect, an embodiment of this application provides a communication apparatus, configured to perform the method in any one of the second aspect, the fourth aspect, the sixth aspect, the eighth aspect, or the possible implementations thereof. The communication apparatus includes corresponding units, configured to perform the method in any one of the second aspect, the fourth aspect, the sixth aspect, the eighth aspect, or the possible implementations thereof.

For example, the communication apparatus may include a transceiver unit and a processing unit. The communication apparatus may be the AP MLD in the second aspect, the fourth aspect, the sixth aspect, or the eighth aspect, or a chip in the AP MLD, for example, a Wi-Fi chip.

According to an eleventh aspect, an embodiment of this application provides a communication apparatus. The communication apparatus includes a processor, configured to perform the method in any one of the first aspect, the third aspect, the fifth aspect, the seventh aspect, or the possible implementations thereof.

In a process of performing the foregoing methods, a process of sending the information and a process of receiving the information in the foregoing methods may be understood as a process of outputting the information by the processor and a process of receiving the input information by the processor. When outputting the information, the processor outputs the information to a transceiver, so that the transceiver transmits the information. After the information is output by the processor, other processing may further need to be performed on the information before the information arrives at the transceiver. Similarly, when the processor receives the input information, the transceiver receives the information and inputs the information to the processor. Still further, after the transceiver receives the information, other processing may need to be performed on the information before the information is input to the processor.

Based on the foregoing principle, for example, the sending the probe request frame mentioned in the foregoing method may be understood as outputting, by the processor, the probe request frame. For another example, the receiving the probe response frame may be understood as receiving, by the processor, the input probe response frame.

Unless otherwise specified, operations such as transmission, sending, and receiving related to the processor may be more generally understood as operations such as output, receiving, and input of the processor if the operations do not conflict with actual functions or internal logic of the operations in related descriptions.

In an implementation process, the processor may be a processor specially configured to perform these methods, or a processor, for example, a general-purpose processor, configured to execute computer instructions in a memory to perform these methods. The memory may be a non-transitory (non-transitory) memory, for example, a read-only memory (Read-Only Memory, ROM). The memory and the processor may be integrated into a same chip, or may be separately disposed on different chips. A type of the memory and a manner of disposing the memory and the processor are not limited in this embodiment of this application.

In a possible implementation, the memory is located outside the communication apparatus.

In a possible implementation, the memory is located inside the communication apparatus.

In this embodiment of this application, the processor and the memory may alternatively be integrated into one component. In other words, the processor and the memory may alternatively be integrated together.

In a possible implementation, the communication apparatus further includes a transceiver. The transceiver is configured to receive a signal and/or send a signal. For example, the transceiver may be configured to send a probe request frame. For another example, the transceiver may be further configured to receive a probe response frame and the like.

In this embodiment of this application, the communication apparatus may be the non-AP MLD in the first aspect, the third aspect, the fifth aspect, or the seventh aspect.

According to a twelfth aspect, an embodiment of this application provides a communication apparatus. The communication apparatus includes a processor, configured to execute a program stored in a memory. When the program is executed, the communication apparatus is enabled to perform the method in any one of the second aspect, the fourth aspect, the sixth aspect, the eighth aspect, or the possible implementations thereof.

In a possible implementation, the memory is located outside the communication apparatus.

In a possible implementation, the memory is located inside the communication apparatus.

In this embodiment of this application, the processor and the memory may alternatively be integrated into one component. In other words, the processor and the memory may alternatively be integrated together.

In a possible implementation, the communication apparatus further includes a transceiver. The transceiver is configured to receive a signal and/or send a signal. For example, the transceiver may be configured to receive a probe request frame. For another example, the transceiver may be further configured to send a probe response frame and the like.

In this embodiment of this application, the communication apparatus may be the AP MLD in the second aspect, the fourth aspect, the sixth aspect, or the eighth aspect.

According to a thirteenth aspect, an embodiment of this application provides a communication apparatus. The communication apparatus includes a logic circuit and an interface. The logic circuit is coupled to the interface. The logic circuit is configured to generate a probe request frame. The interface is configured to output the probe request frame.

In this embodiment of this application, the communication apparatus may be configured to perform any possible implementation of the first aspect, the third aspect, the fifth aspect, or the seventh aspect. Details are not described herein again. For specific descriptions of the probe request frame and/or a probe response frame, refer to the first aspect, the third aspect, the fifth aspect, the seventh aspect, or the like. Details are not described herein again.

According to a fourteenth aspect, an embodiment of this application provides a communication apparatus. The communication apparatus includes a logic circuit and an interface. The logic circuit is coupled to the interface. The interface is configured to input a probe request frame. The logic circuit is configured to generate a probe response frame based on the probe request frame. The interface is further configured to output the probe response frame.

In this embodiment of this application, the communication apparatus may be configured to perform any possible implementation of the second aspect, the fourth aspect, the sixth aspect, or the eighth aspect. Details are not described herein again. For specific descriptions of the probe request frame and/or the probe response frame, refer to the second aspect, the fourth aspect, the sixth aspect, the eighth aspect, or the like. Details are not described herein again.

According to a fifteenth aspect, an embodiment of this application provides a computer-readable storage medium. The computer-readable storage medium is configured to store a computer program. When the computer program is run on a computer, the method in any one of the first aspect or the possible implementations of the first aspect, the method in any one of the third aspect or the possible implementations of the third aspect, the method in any one of the fifth aspect or the possible implementations of the fifth aspect, or the method in any one of the seventh aspect or the possible implementations of the seventh aspect is performed.

According to a sixteenth aspect, an embodiment of this application provides a computer-readable storage medium. The computer-readable storage medium is configured to store a computer program. When the computer program is run on a computer, the method in any one of the second aspect or the possible implementations of the second aspect, the method in any one of the fourth aspect or the possible implementations of the fourth aspect, the method in any one of the sixth aspect or the possible implementations of the sixth aspect, or the method in any one of the eighth aspect or the possible implementations of the eighth aspect is performed.

According to a seventeenth aspect, an embodiment of this application provides a computer program product. The computer program product includes a computer program or computer code. When the computer program product is run on a computer, the method in any one of the first aspect or the possible implementations of the first aspect, the method in any one of the third aspect or the possible implementations of the third aspect, the method in any one of the fifth aspect or the possible implementations of the fifth aspect, or the method in any one of the seventh aspect or the possible implementations of the seventh aspect is performed.

According to an eighteenth aspect, an embodiment of this application provides a computer program product. The computer program product includes a computer program or computer code. When the computer program product is run on a computer, the method in any one of the second aspect or the possible implementations of the second aspect, the method in any one of the fourth aspect or the possible implementations of the fourth aspect, the method in any one of the sixth aspect or the possible implementations of the sixth aspect, or the method in any one of the eighth aspect or the possible implementations of the eighth aspect is performed.

According to a nineteenth aspect, an embodiment of this application provides a computer program. When the computer program is run on a computer, the method in any one of the first aspect or the possible implementations of the first aspect, the method in any one of the third aspect or the possible implementations of the third aspect, the method in any one of the fifth aspect or the possible implementations of the fifth aspect, or the method in any one of the seventh aspect or the possible implementations of the seventh aspect is performed.

According to a twentieth aspect, an embodiment of this application provides a computer program. When the computer program is run on a computer, the method in any one of the second aspect or the possible implementations of the second aspect, the method in any one of the fourth aspect or the possible implementations of the fourth aspect, the method in any one of the sixth aspect or the possible implementations of the sixth aspect, or the method in any one of the eighth aspect or the possible implementations of the eighth aspect is performed.

According to a twenty-first aspect, an embodiment of this application provides a multi-link communication system. The multi-link communication system includes a non-AP MLD and an AP MLD.

In a possible implementation, the non-AP MLD is configured to perform the method in any one of the first aspect or the possible implementations of the first aspect. The AP MLD is configured to perform the method in any one of the second aspect or the possible implementations of the second aspect.

In a possible implementation, the non-AP MLD is configured to perform the method in any one of the third aspect or the possible implementations of the third aspect. The AP MLD is configured to perform the method in any one of the fourth aspect or the possible implementations of the fourth aspect.

In a possible implementation, the non-AP MLD is configured to perform the method in any one of the fifth aspect or the possible implementations of the fifth aspect. The AP MLD is configured to perform the method in any one of the sixth aspect or the possible implementations of the sixth aspect.

In a possible implementation, the non-AP MLD is configured to perform the method in any one of the seventh aspect or the possible implementations of the seventh aspect. The AP MLD is configured to perform the method in any one of the eighth aspect or the possible implementations of the eighth aspect.

DESCRIPTION OF EMBODIMENTS

Figure 1A:
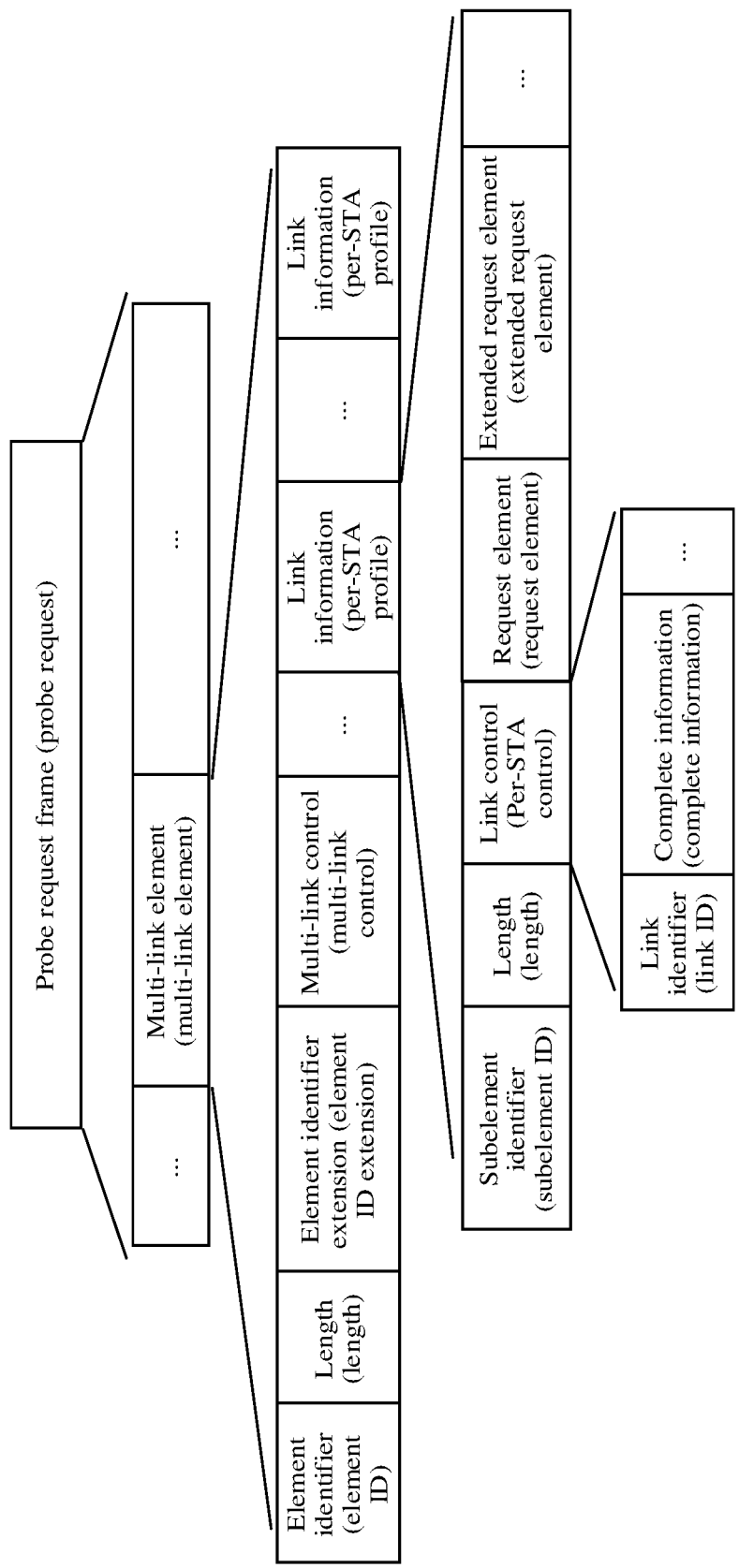
FIG. 1a is a schematic diagram of a structure of a probe request frame according to an embodiment of this application.

To make the objectives, technical solutions, and advantages of this application clearer, the following further describes this application with reference to the accompanying drawings.

In the description, claims, and accompanying drawings of this application, the terms "first", "second", and so on are intended to distinguish between different objects but do not indicate a particular order. In addition, the terms "including" and "having" and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another step or unit inherent to the process, the method, the product, or the device.

"Embodiment" mentioned in this specification means that a particular feature, structure, or characteristic described with reference to the embodiment may be included in at least one embodiment of this application. The phrase shown in various locations in the specification may not necessarily refer to a same embodiment, and is not an independent or optional embodiment exclusive from another embodiment. It is explicitly and implicitly understood by a person skilled in the art that embodiments described in the specification may be combined with another embodiment.

In this application, "at least one (item)" means one or more, "a plurality of" means two or more, and "at least two (items)" means two or three or more. The term "and/or" is used to describe an association relationship between associated objects and indicates that three relationships may exist. For example, "A and/or B" may indicate the following three cases: Only A exists, only B exists, and both A and B exist, where A and B may be singular or plural. The character "/" generally represents an "or" relationship between associated objects. "At least one (item) of the following" or a similar expression thereof means any combination of these items. For example, at least one (item) of a, b, or c may represent a, b, c, "a and b", "a and c", "b and c", or "a, b, and c".

A multi-link communication probe request method provided in this application may be applied to a wireless communication system. The wireless communication system may include a wireless local area network (wireless local area network, WLAN), a cellular network, or the like. The method may be implemented by a communication device in the wireless communication system, a logic circuit or a processor in the communication device, or the like. The communication device may be a wireless communication device that supports parallel transmission on a plurality of links, for example, referred to as a multi-link device (multi-link device, MLD) or a multi-band device (multi-band device). For example, in the wireless local area network, the communication device supports communication by using IEEE 802.11 series protocols. The IEEE 802.11 series protocols include: 802.11be, 802.11ax, 802.11a/b/g/n/ac, or the like. Details are not described herein again.

The following describes terms in this application in detail.

1. Multi-Link Device

A multi-link device includes one or more affiliated stations. The affiliated station is a logical station, and may operate on one link, one band, one channel, or the like. The affiliated station may be an access point (access point, AP) or a non-access point station (non-access point station, non-AP STA). For ease of description, in this application, a multi-link device whose affiliated station is an AP may be referred to as a multi-link AP, a multi-link AP device, or an AP multi-link device (AP multi-link device, AP MLD). A multi-link device whose affiliated station is a non-AP STA is referred to as a multi-link STA, a multi-link STA device, or a STA multi-link device (STA multi-link device), or a multi-link device whose affiliated station is a non-AP STA is referred to as a multi-link non-AP, a multi-link non-AP device, a non-AP multi-link device (non-AP multi-link device, non-AP MLD), or the like. In the following description, a multi-link device whose affiliated station is an AP is referred to as an AP MLD, and a multi-link device whose affiliated station is a non-AP STA is referred to as a non-AP MLD.

The multi-link device may implement wireless communication in compliance with the 802.11 series protocols. For example, a multi-link device in compliance with an extremely high throughput (extremely high throughput, EHT) or a multi-link device in compliance with 802.11be or compatible with 802.11be implements communication with another device.

A multi-link device (which may be a non-AP MLD or an AP MLD herein) is a communication apparatus having a wireless communication function. The communication apparatus may be an entire system device, or may be a chip, a processing system, or the like installed in an entire system device. A device in which the chip or the processing system is installed may implement the method and the function in embodiments of this application under the control of the chip or the processing system. For example, the non-AP multi-link device in embodiments of this application has a wireless transceiver function, may support the 802.11 series protocols, and may communicate with the AP multi-link device or another non-AP multi-link device. For example, the non-AP multi-link device is any user communication device that allows a user to communicate with an AP and then communicate with a WLAN. For example, the non-AP multi-link device may be user equipment that can be connected to a network, such as a tablet computer, a desktop computer, a laptop computer, a notebook computer, an ultra-mobile personal computer (ultra-mobile personal computer, UMPC), a handheld computer, a netbook, a personal digital assistant (personal digital assistant, PDA), or a mobile phone, may be an internet of things node in the internet of things, or may be a vehicle-mounted communication apparatus in the internet of vehicles. The non-AP multi-link device may alternatively be a chip and a processing system in the foregoing terminals. The AP multi-link device may be an apparatus that provides a service for the non-AP multi-link device, and may support the 802.11 series protocols. For example, the AP multi-link device may be a communication entity such as a communication server, a router, a switch, or a bridge, or the AP multi-link device may include various forms of macro base stations, micro base stations, relay stations, and the like. Certainly, the AP multi-link device may alternatively be chips and processing systems in the various forms of devices. The 802.11 protocol may be a protocol that supports 802.11be or is compatible with 802.11be.

It may be understood that the multi-link device may support high-rate and low-latency transmission. With continuous evolution of application scenarios of a wireless local area network, the multi-link device may be further applied to more scenarios, for example, a sensor node (for example, a smart meter, a smart electricity meter, and a smart air detection node) in a smart city, a smart device (for example, a smart camera, a projector, a display, a TV, a stereo, a refrigerator, and a washing machine) in a smart home, a node in the internet of things, an entertainment terminal (for example, a wearable device such as an AR and a VR), a smart device (such as a printer and a projector) in a smart office, an internet of things device in the internet of vehicles, and some infrastructures (for example, a vending machine, a self-service navigation station in a supermarket, a self-service cash register device, and a self-service ordering machine) in daily life scenarios. A specific form of the multi-link device is not limited in embodiments of this application, and is merely an example for description herein.

2. Link

Each logical station may operate on one link, and a plurality of logical stations are allowed to operate on a same link. A link identifier mentioned below represents one station operating on one link. In other words, if there is more than one logical station on one link, more than one link identifier is required to represent the logical stations. The link mentioned below sometimes also indicates a station operating on the link. During data transmission, an AP MLD and a non-AP MLD may use a link identifier to identify a link or a station on a link. Before communication, the AP MLD and the non-AP MLD may first negotiate or communicate a correspondence between a link identifier and a link or a station on a link. Therefore, during data transmission, the link identifier is carried without transmitting a large amount of signaling information to indicate the link or the station on the link. This reduces signaling overheads and improves transmission efficiency.

In an example, a management frame, for example, a beacon (beacon) frame, sent by the AP MLD when establishing a basic service set (basic service set, BSS) carries a multi-link element. The multi-link element may include a plurality of link identifier (link ID) fields. The link identifier field may suggest (or indicate) a correspondence between a link identifier and a station operating on a link. For example, the link identifier field includes a link identifier, and may also include any one or more of the following: a media access control (medium access control, MAC) address, an operating class, and a channel number. One or more of the MAC address, the operating class, and the channel number may indicate one link. A MAC address of an AP may be a basic service set identifier (basic service set identifier, BSSID) of the AP.

In another example, in a process of multi-link device association, an AP MLD and a non-AP MLD negotiate a plurality of link identifier fields. The multi-link association refers to one association between one AP of the AP MLD and one STA of the non-AP MLD. The association may facilitate separate association between a plurality of STAs of the non-AP MLD and a plurality of APs of the AP MLD, where one STA is associated with one AP.

In subsequent communication, a link identifier is used by the AP MLD or the non-AP MLD to represent a station of the non-AP MLD, and the link identifier may further represent one or more attributes of a MAC address, an operating class, and a channel number of the station. The MAC address of the station may be replaced with an association identifier of the station after the non-AP MLD is associated with the AP MLD. Optionally, if a plurality of stations operate on one link, a link identifier (for example, an ID) indicates an operating class and a channel number of the link, and further indicates an identifier of a station operating on the link, for example, a MAC address or an association identifier (association identifier, AID) of the station.

3. Multi-Link Element

FIG. 1a is a schematic diagram of a structure of a multi-link element (multi-link element, MLE) according to an embodiment of this application. The MLE may be carried in a probe request frame (probe request frame). The MLE may be used to carry link information of a multi-link device for sending the MLE. The MLE may further indicate link information required by the multi-link device for sending the MLE. For example, the MLE shown in FIG. 1a is used to request link information of an AP MLD, and also indicates link information of a non-AP MLD. In other words, the MLE is used to request the AP MLD to feed back the link information of the AP MLD, and also indicates the link information sent by the non-AP MLD.

As shown in FIG. 1a, the MLE may include an element identifier (element ID) field, a length (length) field, an element identifier extension (element ID extension) field, a multi-link control (multi-link control) field, and one or more per-STA profile (per-STA profile) fields. It may be understood that based on the relationship between a link and a STA described in this application, the per-STA profile field described herein may also be referred to as a link information field. For brevity of this application, the per-STA profile field is referred to as the link information field in this specification. It may be understood that the element identifier may also be referred to as a unit identifier, and the element identifier extension may also be referred to as a unit identifier extension. A name of a field is not limited in this embodiment of this application.

The per-STA profile field may include a subelement identifier (subelement ID) field, a length (length) field, a link control (per-STA control) field, a request element (request element) field (which may also be referred to as a request unit, a request element unit, or the like), an extended request element (extended request element) field (which may also be referred to as an extended request unit or an extended request unit field), and the like. The per-STA control field may include a link identifier (link ID) field, a complete information (complete information) field, and the like. In other words, the per-STA profile field may be used to carry information of a link. The information of the link may include a link identifier (link ID) field, and may further include other information of the link and the like. The other information of the link may be, for example, capabilities information of a station operating on the link and the like. In other words, the per-STA profile field one-to-one corresponds to the link.

When a value of the complete information field is 1, it indicates that the per-STA profile field carries complete information of a corresponding link. The corresponding link described here indicates a link corresponding to the per-STA profile field. In other words, the corresponding link indicates a link identified by the link identifier field in the per-STA profile field. In addition, the MLE has an inheritance structure, and the per-STA profile field does not carry information elements (which may also be referred to as information units) that are the same as those of a transmitting link (transmitting link). To be specific, when content of an information element of a STA on a link in the MLE is the same as content of an information element of a STA on the link (namely, the transmitting link) for sending the MLE, the per-STA profile field corresponding to the link does not include the information element. When content of an information element of a STA on a link is different from content of an information element of a STA on the link for sending the MLE, the per-STA profile field or a non-inheritance element (non-inheritance element) in the per-STA profile field needs to carry an element ID of the information element. In other words, when the per-STA profile field does not carry the information element, and the non-inherited element in the per-STA profile field does not carry the element ID of the information element, the content of the information element is the same as the content of the information element of the STA on the link for sending the MLE.

In addition, the non-AP MLD may carry a request element (request element) in the probe request frame or the per-STA profile field of the MLE, to request the AP MLD to feed back partial or specific information elements (namely, partial information). Generally, when the probe request frame does not carry the request element other than the MLE, it indicates that the AP MLD is requested to feed back all information elements (namely, complete information) of the transmitting link. When the per-STA profile field of the MLE does not carry the request element, it indicates that the AP MLD is requested to feed back complete information of a corresponding link.

The corresponding link described herein indicates a link identified by the link identifier field in the per-STA profile field. The description of the corresponding link is also applicable in the following description. It may be understood that for specific descriptions of the extended request element, refer to the descriptions of the request element. Details are not described herein again.

The complete information and the partial information in this embodiment of this application are relative to one link. To be specific, all information elements (or all information units) corresponding to one link are referred to as complete information for short, and partial or specific information elements corresponding to one link are referred to as partial information.

Figure 1B:
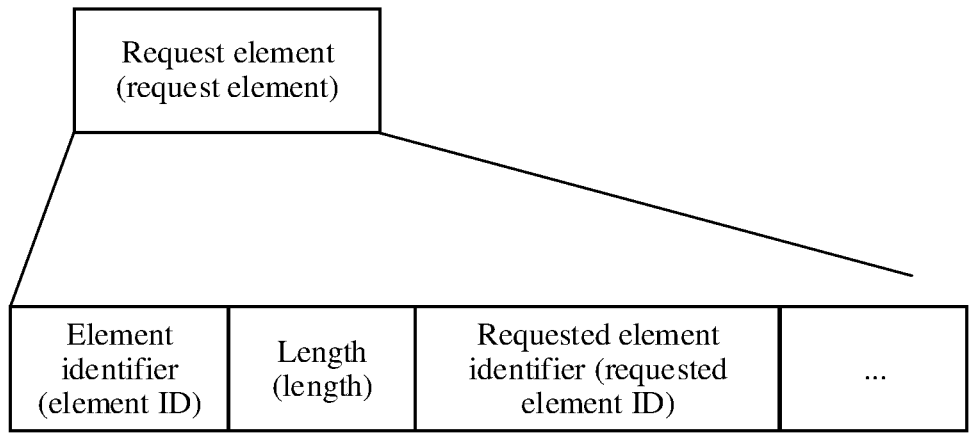
FIG. 1b is a schematic diagram of a structure of a request element according to an embodiment of this application.
Figure 1C:
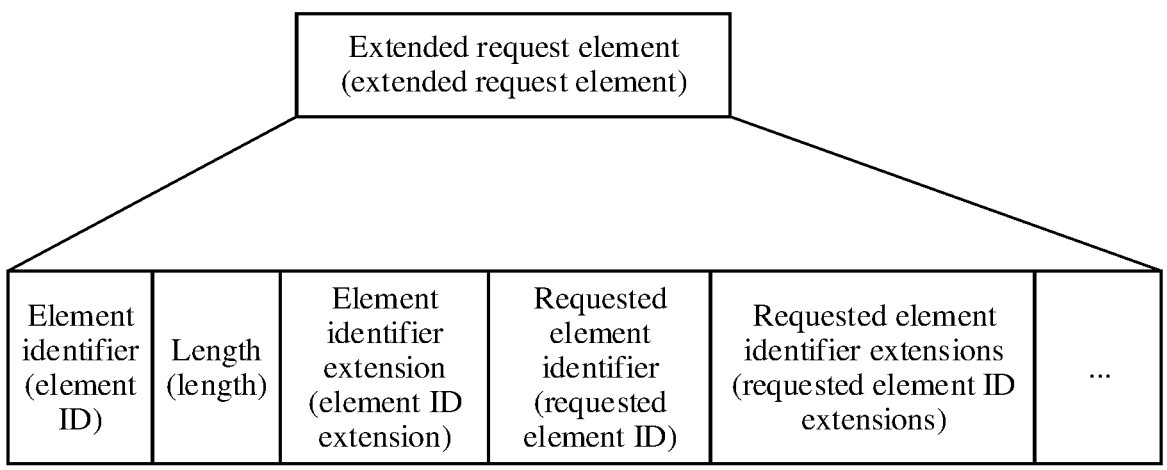
FIG. 1c is a schematic diagram of a structure of an extended request element according to an embodiment of this application.

FIG. 1b and FIG. 1c show schematic diagrams of a structure of a request element and a schematic diagram of a structure of an extended request element (extended request element) respectively. As shown in FIG. 1b, the request element may include an element identifier (element ID), a length (length), and a requested element identifier (requested element ID). In addition to the element identifier, the length, and the requested element identifier, the extended request element may further include an element identifier extension (element ID extension) and a requested element identifier extensions (requested element ID extensions). As shown in FIG. 1b and FIG. 1c, it may be learned that the request element and/or the extended request element may indicate an information element that is of a corresponding link and that is requested by a non-AP MLD.

It may be understood that the schematic diagrams of the structures shown in FIG. 1b and FIG. 1c are merely examples. The structure of the request element and the structure of the extended request element may change with standard development, technology evolution, or the like. This is not limited in this application.

It may be understood that in the following descriptions, a request element may also be referred to as a request element field, a request unit, or the like, and an extended request element may also be referred to as an extended request element field or an extended request unit. In addition, an information element in the following descriptions may also be referred to as an information unit or the like. Details are not described herein again.

With reference to the non-AP MLD and the AP MLD in the foregoing descriptions, the following describes a communication scenario of a multi-link communication probe request method provided in this application and structures of the non-AP MLD and the AP MLD.

Figure 2A:
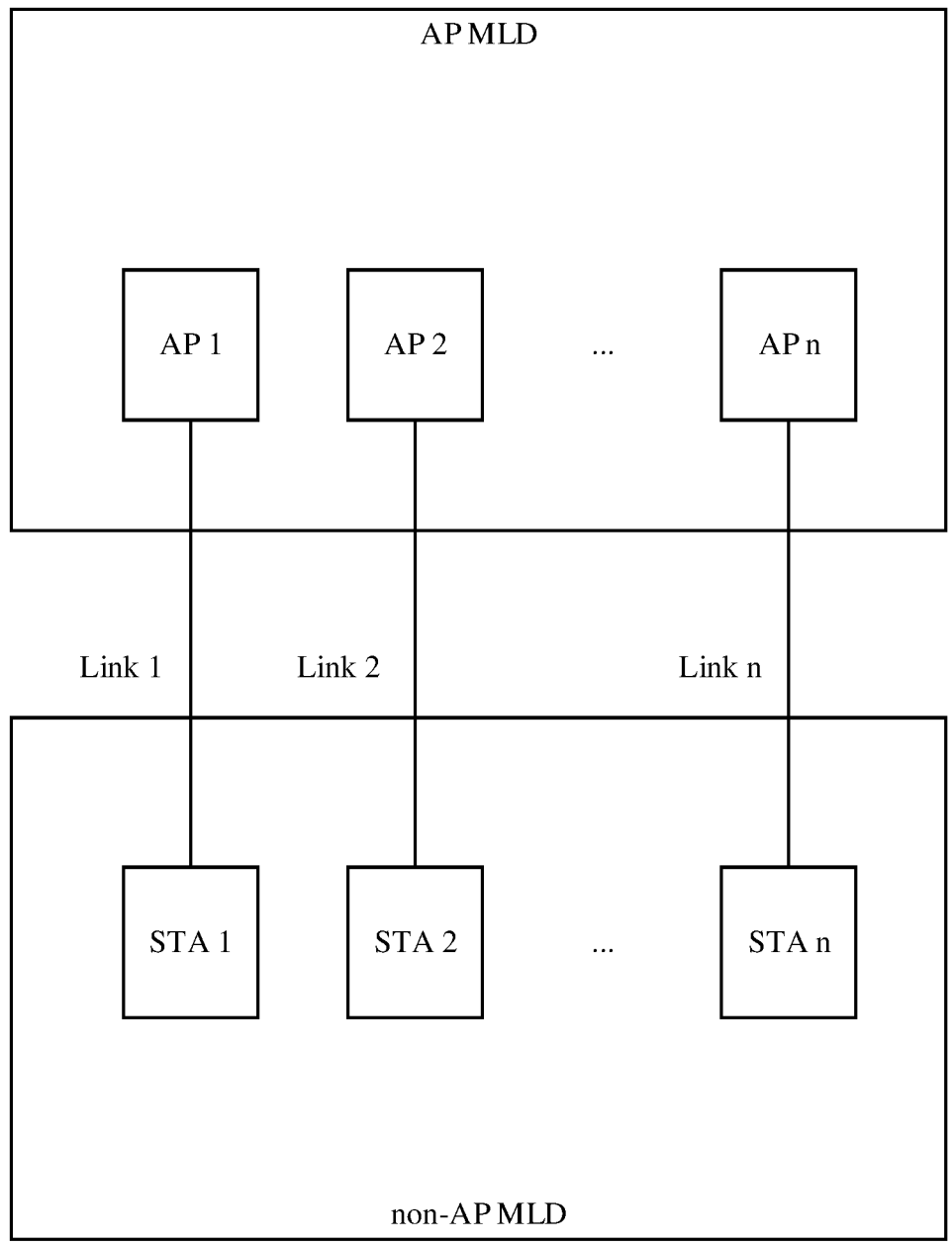
FIG. 2a is a schematic diagram of a scenario of communication between a non-AP MLD and an AP MLD according to an embodiment of this application.

FIG. 2a is a schematic diagram of a scenario of communication between a non-AP MLD and an AP MLD according to an embodiment of this application. As shown in FIG. 2a, the AP MLD includes an AP 1, an AP 2, . . . , and an AP n. The non-AP MLD includes a STA 1, a STA 2, . . . , and a STA n. Herein, n is a positive integer. The AP MLD and the non-AP MLD may perform parallel communication on a link 1, a link 2, . . . , and a link n. The STA 1 in the non-AP MLD establishes an association relationship with the AP 1 in the AP MLD. The STA 2 in the non-AP MLD establishes an association relationship with the AP 2 in the AP MLD. The STA n in the non-AP MLD establishes an association relationship with the AP n in the AP MLD. Therefore, one or more STAs in the non-AP MLD and one or more APs in the AP MLD may communicate after establishing an association relationship.

Figure 2B:
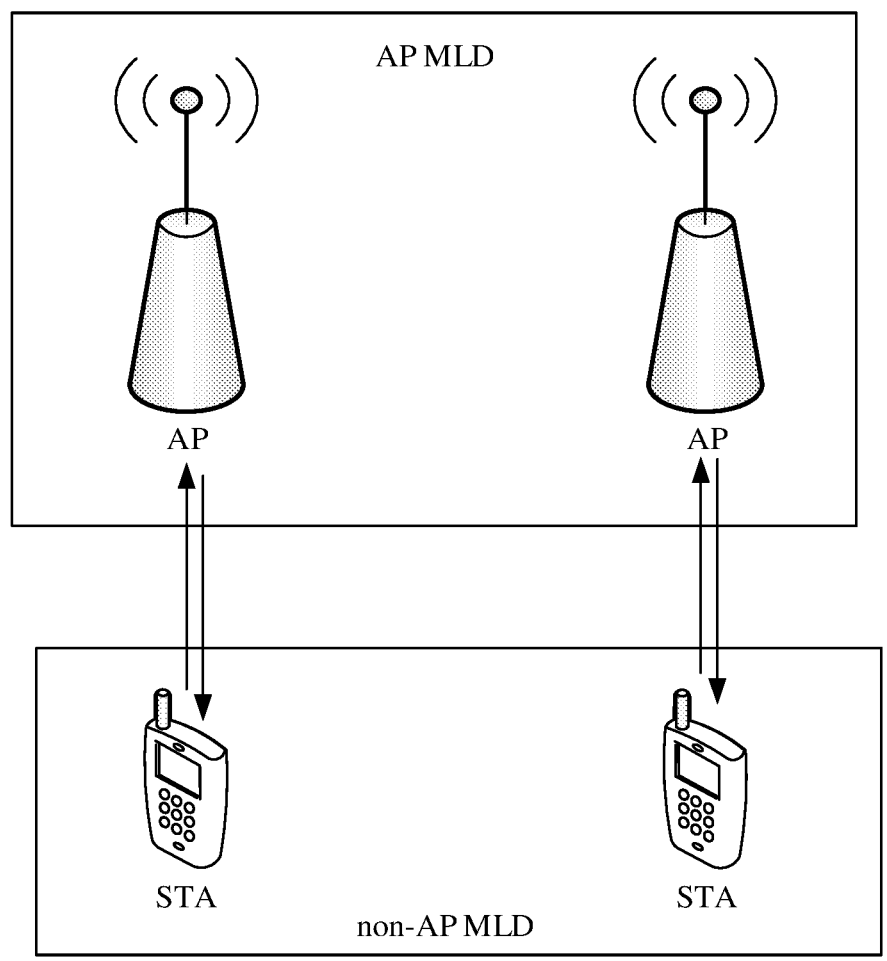
FIG. 2b is a schematic diagram of an architecture of a wireless communication system according to an embodiment of this application.

The multi-link communication probe request method provided in this embodiment of this application may be applied to a wireless local area network (wireless local area network, WLAN). FIG. 2b is a schematic diagram of an architecture of a wireless communication system according to an embodiment of this application. As shown in FIG. 2b, the wireless communication system includes at least one AP MLD and at least one non-AP MLD. For example, the AP MLD is a multi-link device that provides a service for the non-AP MLD, and the non-AP MLD may communicate with the AP MLD on a plurality of links. For a specific scenario, refer to FIG. 1a. It may be understood that quantities of the AP MLDs and the non-AP MLDs in FIG. 2 are merely an example.

Figure 3A:
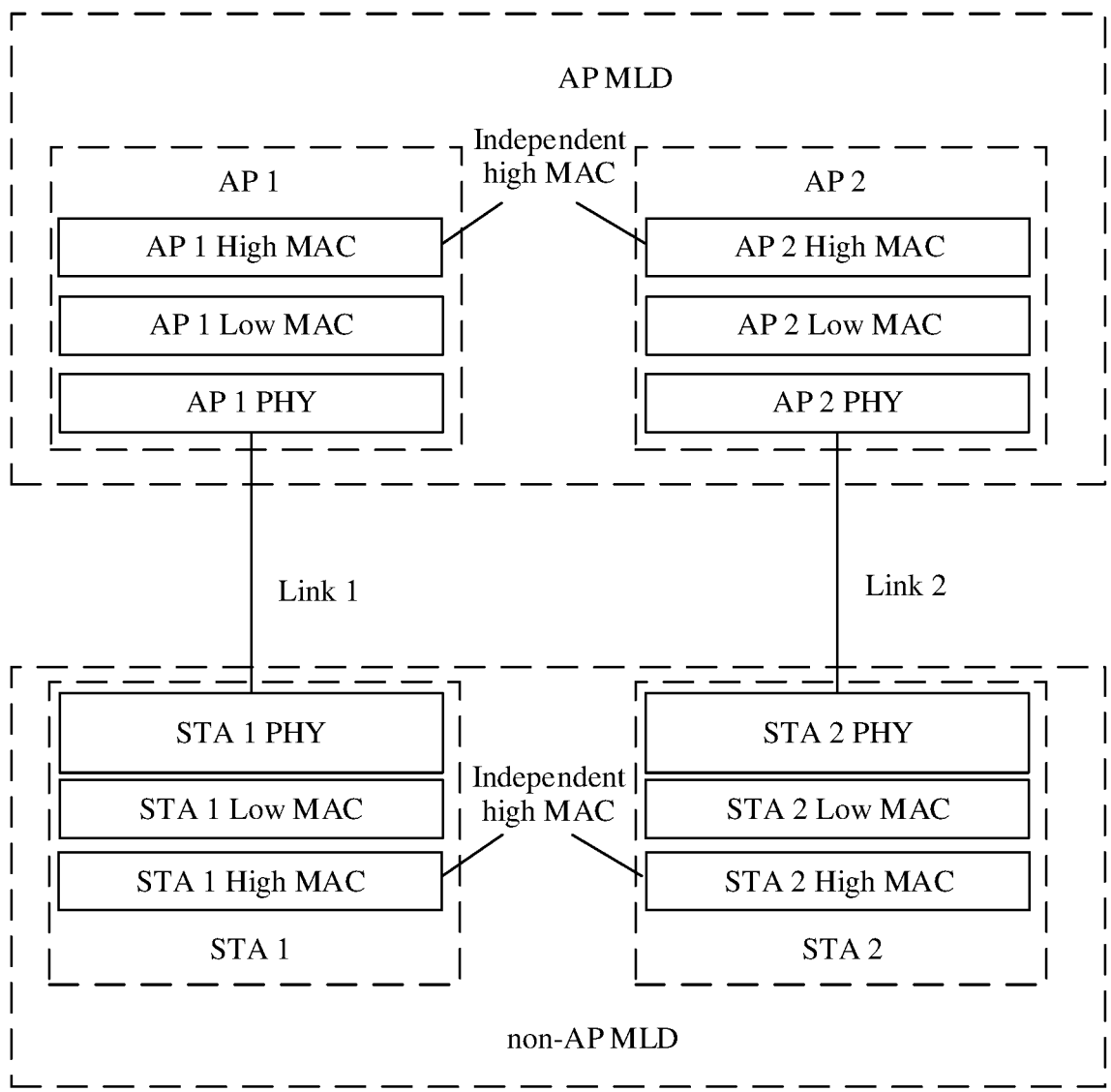
FIG. 3a to FIG. 3c each shows a schematic diagram of structures of an AP MLD and a non-AP MLD according to an embodiment of this application.
Figure 3B:
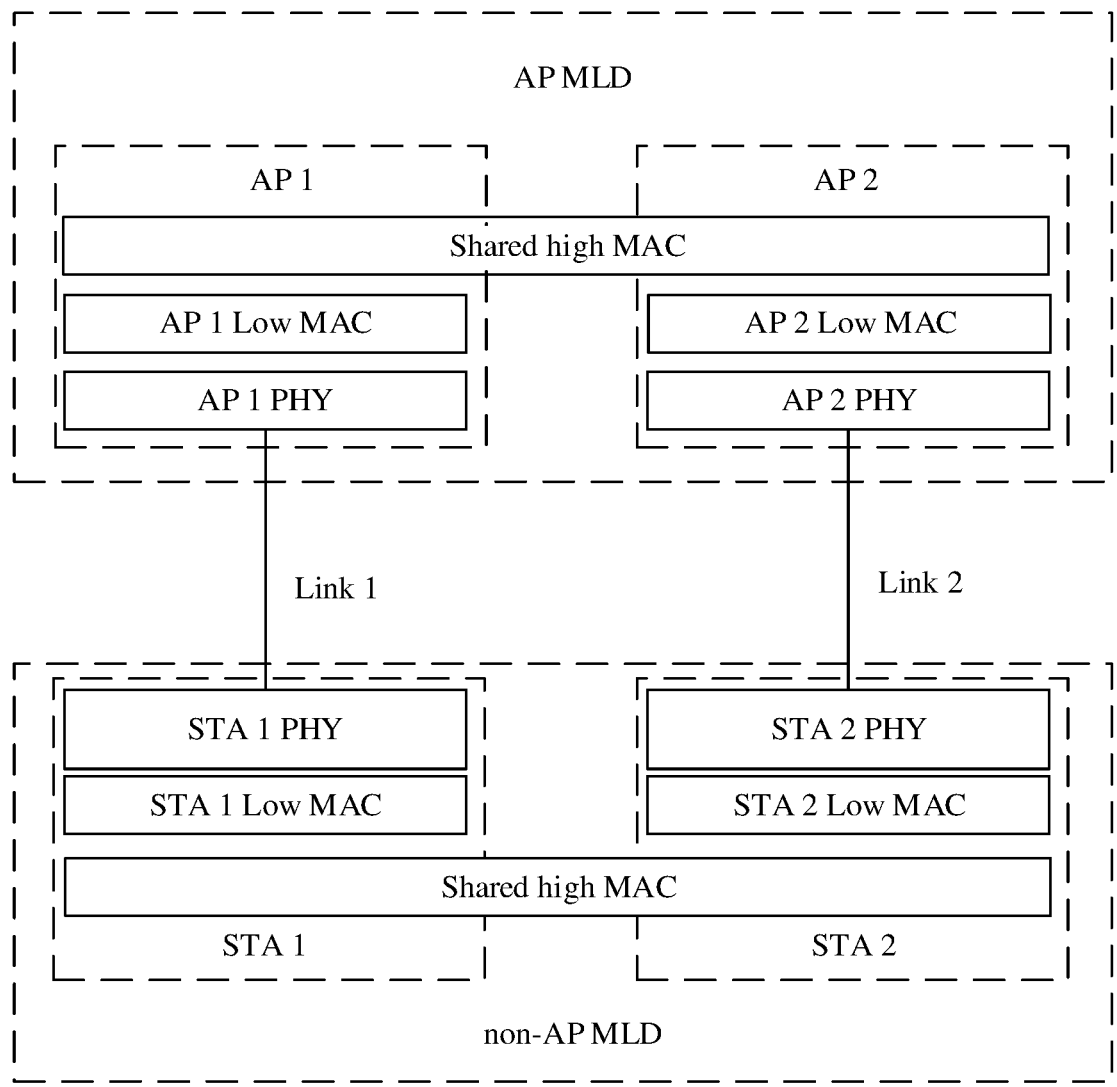

FIG. 3a and FIG. 3b each shows a schematic diagram of structures of an AP MLD and a non-AP MLD according to an embodiment of this application. The 802.11 standard focuses on an 802.11 physical layer (physical layer, PHY) part and a media access control (media access control, MAC) layer part in a multi-link device.

As shown in FIG. 3a, a plurality of APs included in the AP MLD are independent of each other at a low MAC (low MAC) layer and a PHY layer, and are also independent of each other at a high MAC (high MAC) layer. A plurality of STAs included in the non-AP MLD are independent of each other at a low MAC (low MAC) layer and a PHY layer, and are also independent of each other at a high MAC (high MAC) layer.

As shown in FIG. 3b, a plurality of APs included in the AP MLD are independent of each other at a low MAC (low MAC) layer and a PHY layer, and share a high MAC (high MAC) layer. A plurality of STAs included in the non-AP MLD are independent of each other at a low MAC (low MAC) layer and a PHY layer, and share a high MAC (high MAC) layer.

Certainly, the non-AP MLD may use an independent structure at a high MAC layer, and the AP MLD uses a shared structure at a high MAC layer; or the non-AP MLD may use a shared structure at a high MAC layer, and the AP MLD uses an independent structure at a high MAC layer. For example, the high MAC layer or the low MAC layer may be implemented by one processor in a chip system of the multi-link device, or may be implemented by different processing modules in a chip system.

Figure 3C:
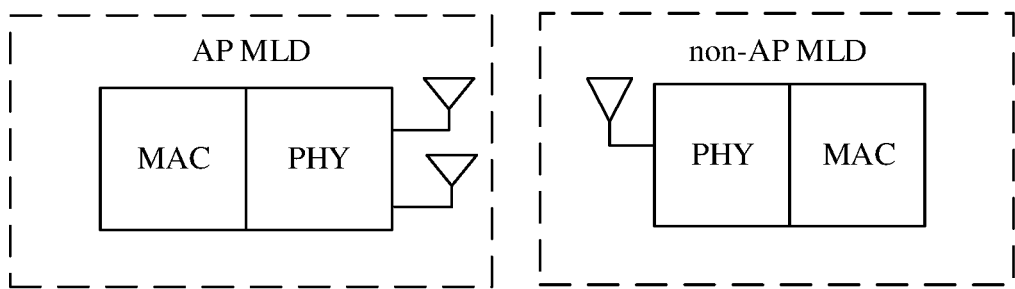
Figure 4A:
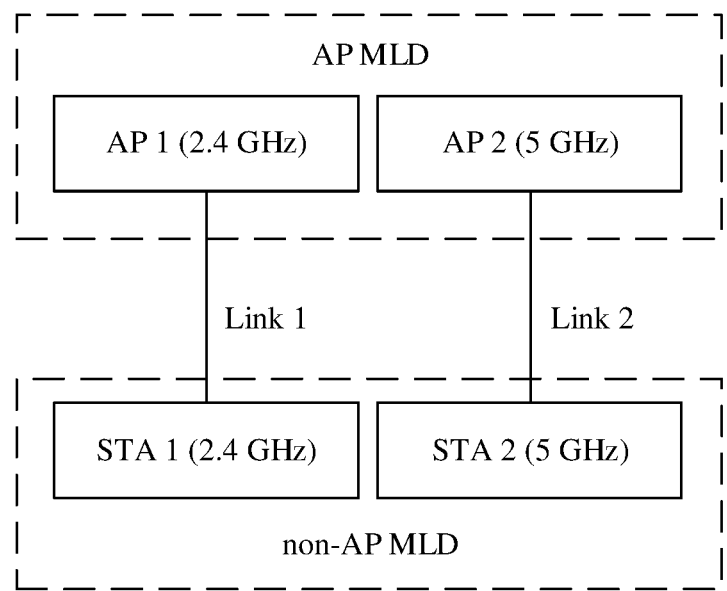
FIG. 4a and FIG. 4b each shows a schematic diagram of communication between an AP MLD and a non-AP MLD through a plurality of links in a wireless local area network according to an embodiment of this application.
Figure 4B:
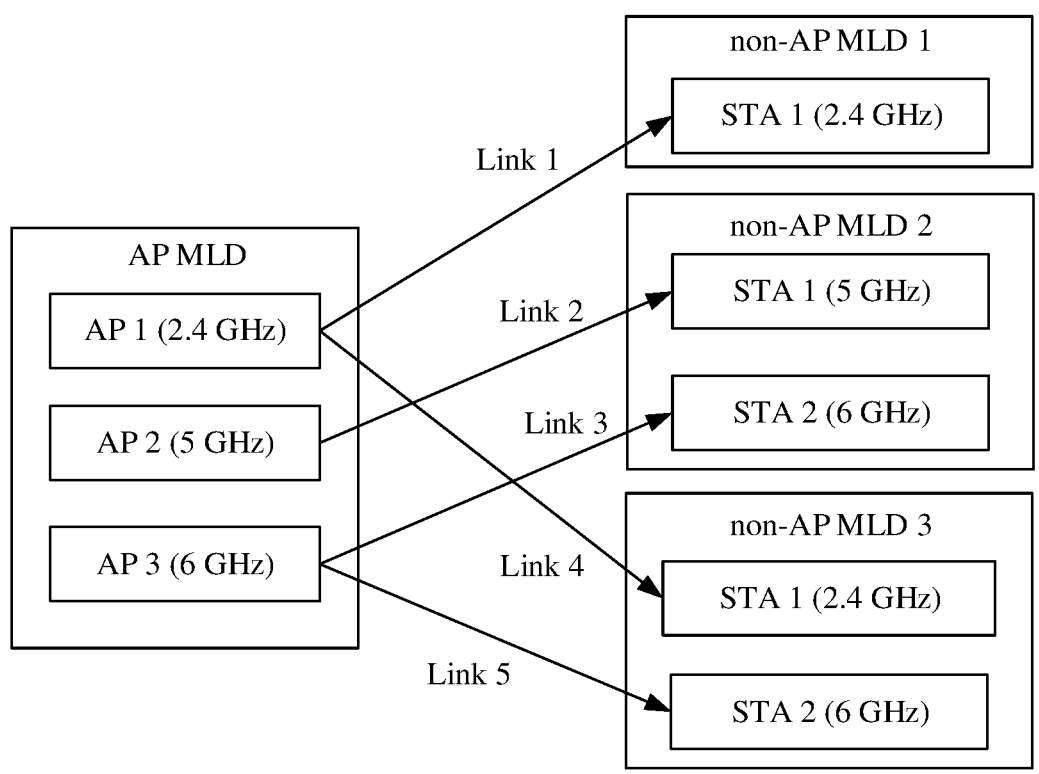

For example, the multi-link device in this embodiment of this application may be a single-antenna device, or may be a multi-antenna device. For example, the multi-link device may be a device with more than two antennas. A quantity of antennas included in the multi-link device is not limited in this embodiment of this application. FIG. 3c shows an example in which the AP MLD is a multi-antenna device and the non-AP MLD is a single-antenna device. In this embodiment of this application, the multi-link device may allow services of a same access type to be transmitted on different links, or even allow same data packets to be transmitted on different links. Alternatively, the multi-link device may not allow services of a same access type to be transmitted on different links, but may allow services of different access types to be transmitted on different links. Optionally, the multi-link device in this application may not include an antenna or a radio frequency unit. Frequency bands in which the multi-link device operates may include but are not limited to sub-1 GHz, 2.4 GHz, 5 GHz, 6 GHz, and a high frequency 60 GHz. FIG. 4a and FIG. 4b each are a schematic diagram of communication between an AP MLD and a non-AP MLD through a plurality of links in a wireless local area network according to an embodiment of this application.

As shown in FIG. 4a, the AP MLD includes an affiliated AP 1 and an affiliated AP 2. The non-AP MLD includes an affiliated STA 1 and an affiliated STA 2. The AP MLD and the non-AP MLD perform parallel communication on a link 1 and a link 2.

FIG. 4b shows a schematic diagram of a scenario of communication between one AP MLD and a plurality of non-AP MLDs. As shown in FIG. 4b, an AP 1 operating in the 2.4 GHz band in the AP MLD may exchange uplink and/or downlink data with a non-AP MLD 1 on a link 1, and exchange uplink and/or downlink data with a STA 1 operating in the 2.4 GHz band in a non-AP MLD 3 on a link 4. An AP 2 operating in the 5 GHz band in the AP MLD may exchange uplink and/or downlink data with a STA 1 operating in the 5 GHz band in a non-AP MLD 2 on a link 2. An AP 3 operating in the 6 GHz band in the AP MLD may exchange uplink and/or downlink data with a STA 2 operating in the 6 GHz band in the non-AP MLD 2 on a link 3, and exchange uplink and/or downlink data with a STA 2 operating in the 6 GHz band in the non-AP MLD 3 on a link 5.

It should be noted that FIG. 4a shows only that the AP MLD supports two frequency bands, and FIG. 4b shows only an example in which the AP MLD supports three frequency bands such as 2.4 GHz, 5 GHz, and 6 GHz, and each frequency band corresponds to one or more links. The link herein may also be understood as a station operating on the link, or the like. During actual applications, the AP MLD and the non-AP MLD may further support more or fewer frequency bands, and values of the frequency bands are not limited to 2.4 GHz, 5 GHz, 6 GHz, and the like. In other words, the AP MLD and the non-AP MLD may operate on more links or fewer links. This is not limited in this application.

It may be learned from the MLE illustrated in FIG. 1a that when the probe request frame does not carry the request element other than the MLE, it indicates that the AP MLD is requested to feed back all the information elements (namely, the complete information) of the transmitting link. When the per-STA profile field of the MLE does not carry the request element, it indicates that the AP MLD is requested to feed back complete information of a corresponding link. However, when the probe request frame carries the request element other than the MLE, but the per-STA profile field of the MLE in the probe request frame does not carry the request element, the AP MLD cannot effectively learn of which one of the complete information and partial information of the link corresponding to the per-STA profile field is fed back. In other words, due to inheritance of the MLE, if the per-STA profile field of the MLE does not carry the request element, it may indicate that content of the information element of the link corresponding to the per-STA profile field is the same as content of the information element of the transmitting link. That is, the non-AP MLD requests the complete information of the link corresponding to the per-STA profile field. However, if the probe request frame carries the request element other than the MLE, it also indicates that the non-AP MLD needs to request the AP MLD to feed back the partial information of the transmitting link. It may be understood that for descriptions of the extended request element, refer to the descriptions of the request element described herein. Details are not described herein again.

In view of this, this application provides a multi-link communication probe request method. The method can effectively resolve the foregoing problem, so that a non-AP MLD can determine which one of complete information and partial information is link information requested by the non-AP MLD, or the non-AP MLD can clearly indicate information required by the non-AP MLD to an AP MLD. This improves information exchange efficiency. For example, according to the method provided in this application, the AP MLD may clearly learn of which one of complete information and partial information of a first link needs to be probed by the AP MLD.

For an application scenario of the multi-link communication probe request method provided in this application, refer to FIG. 2a and/or FIG. 2b. For the AP MLD, the non-AP MLD, and the like in the method provided in this application, refer to FIG. 3a to FIG. 3c, FIG. 4a and/or FIG. 4b, and the like. Details are not described herein again.

An embodiment of this application provides a schematic flowchart of a multi-link communication probe request method.

A non-AP MLD generates a probe request frame and sends the probe request frame to an AP MLD on a transmitting link. The probe request frame includes a first multi-link element. The first multi-link element is used to request link information of the AP MLD. The link information of the AP MLD may include link information of the transmitting link, or may include link information of a non-transmitting link.

This embodiment of this application provides the following implementations of whether to request the link information of the transmitting link.

In a first implementation, the first multi-link element of the probe request frame sent on the transmitting link carries a first link information field. A value of a link identifier in the first link information field is set to a value of a link identifier of the transmitting link, to indicate that the probe request frame needs to request the information of the transmitting link; or a value of a link identifier in the first link information field is set to a value of a link identifier of the non-transmitting link, to indicate that the probe request frame needs to request the information of the non-transmitting link. The value of the link identifier may be a value of a link identifier of a specific link, to indicate that link information of the link (the link is not a transmitting link) is requested. If none of values of link identifiers of first link information fields in the first multi-link element is equal to the value of the link identifier of the transmitting link, it indicates that the probe request frame does not request the information of the transmitting link.

Figure 8A:
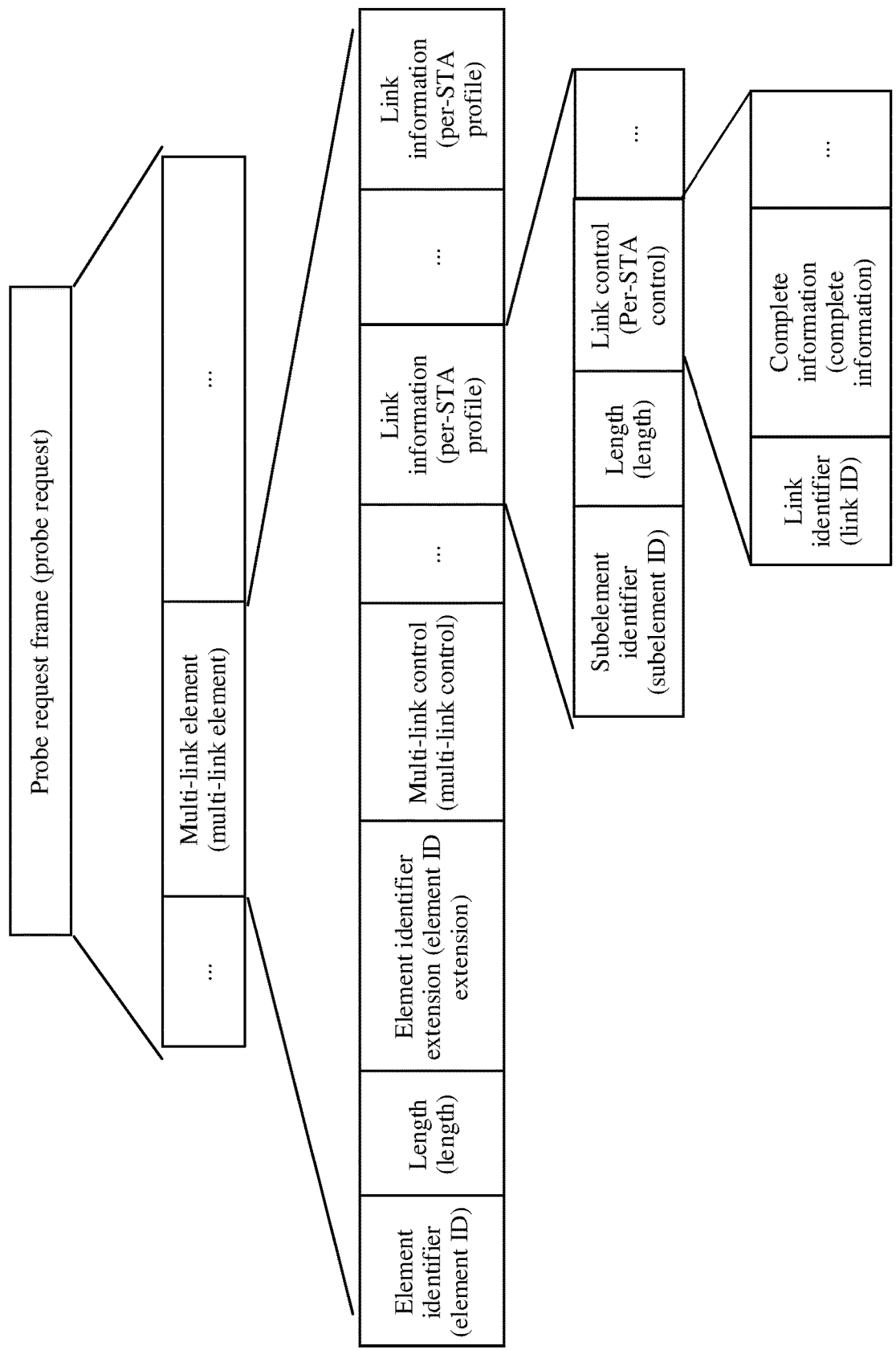
FIG. 8a to FIG. 8e each shows a schematic diagram of a structure of a probe request frame according to an embodiment of this application.
Figure 8B:
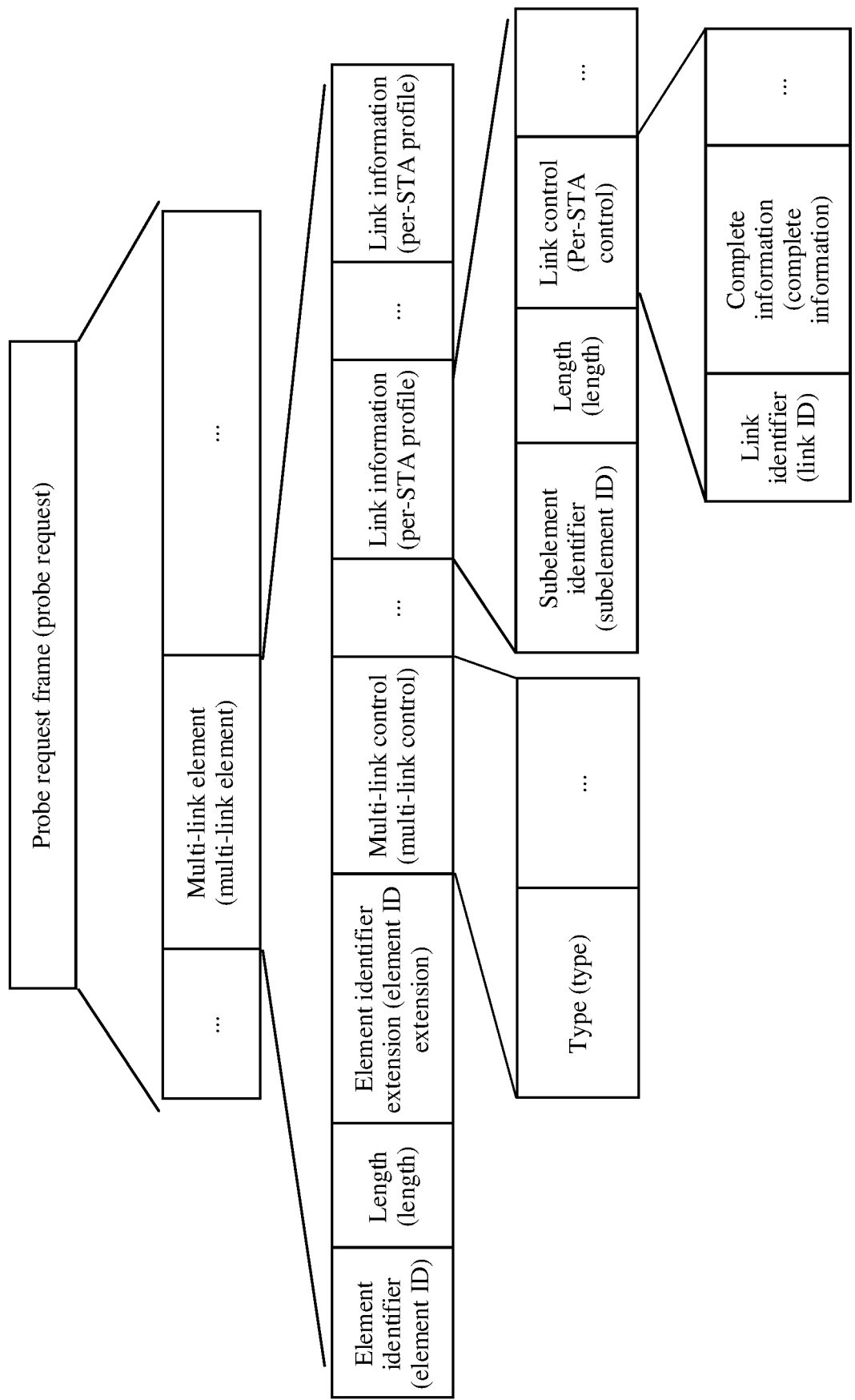
Figure 8C:
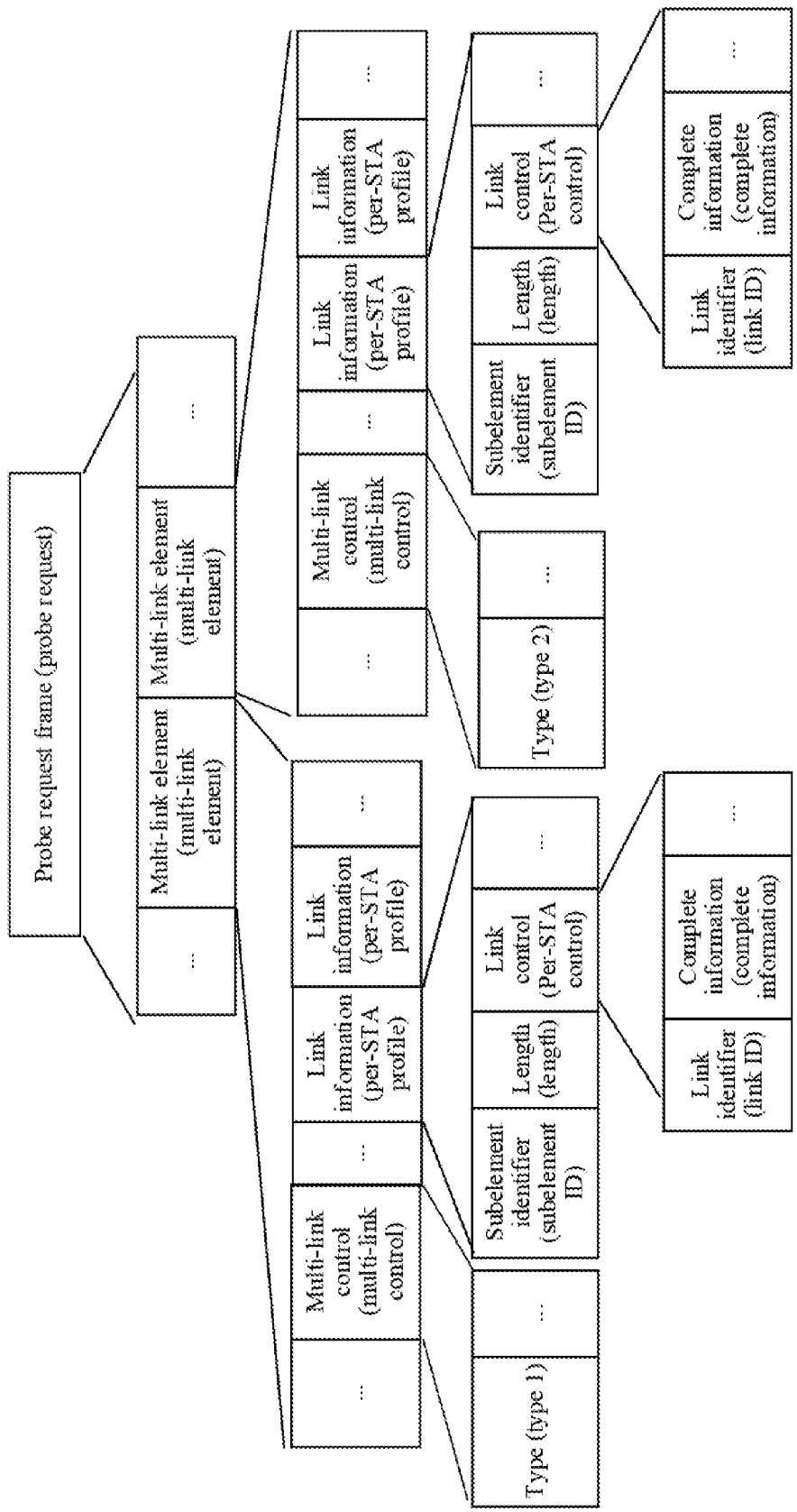

For example, if a link for sending the probe request frame is the first link, the first multi-link element of the probe request frame carries the first link information field, and the value of the link identifier in the first link information field is set to a value of a link identifier of the first link. In FIG. 8a, FIG. 8b, FIG. 8c, or a diagram corresponding to another embodiment, if a value of a link identifier (link ID) of a link control (per-STA control) field of the first link information (per-STA profile) field is equal to the value of the link identifier of the first link, it indicates that the probe request frame needs to request link information of the first link.

In a second implementation, the first multi-link element of the probe request frame sent on the transmitting link does not include link information of the transmitting link. The first multi-link element may further carry an eighth field that is used to indicate whether the probe request frame requests the information of the transmitting link. Specifically, when a value of the eighth field is a first value, it indicates that the probe request frame requests the information of the transmitting link; or when a value of the eighth field is a second value, it indicates that the probe request frame does not request the information of the transmitting link. In this case, the first multi-link element of the probe request frame sent on the transmitting link does not include the link information of the transmitting link, whether to request the link information corresponding to the transmitting link is not indicated by default, and needs to be determined based on the value of the eighth field of the first multi-link element.

The eighth field may be carried at any location outside the link information field. This is not limited in this embodiment of this application. For example, the eighth field may be carried in a multi-link control field of the multi-link element, as shown in FIG. 4c, or the eighth field may be carried outside the multi-link control field, as shown in FIG. 4d.

Figure 4C:
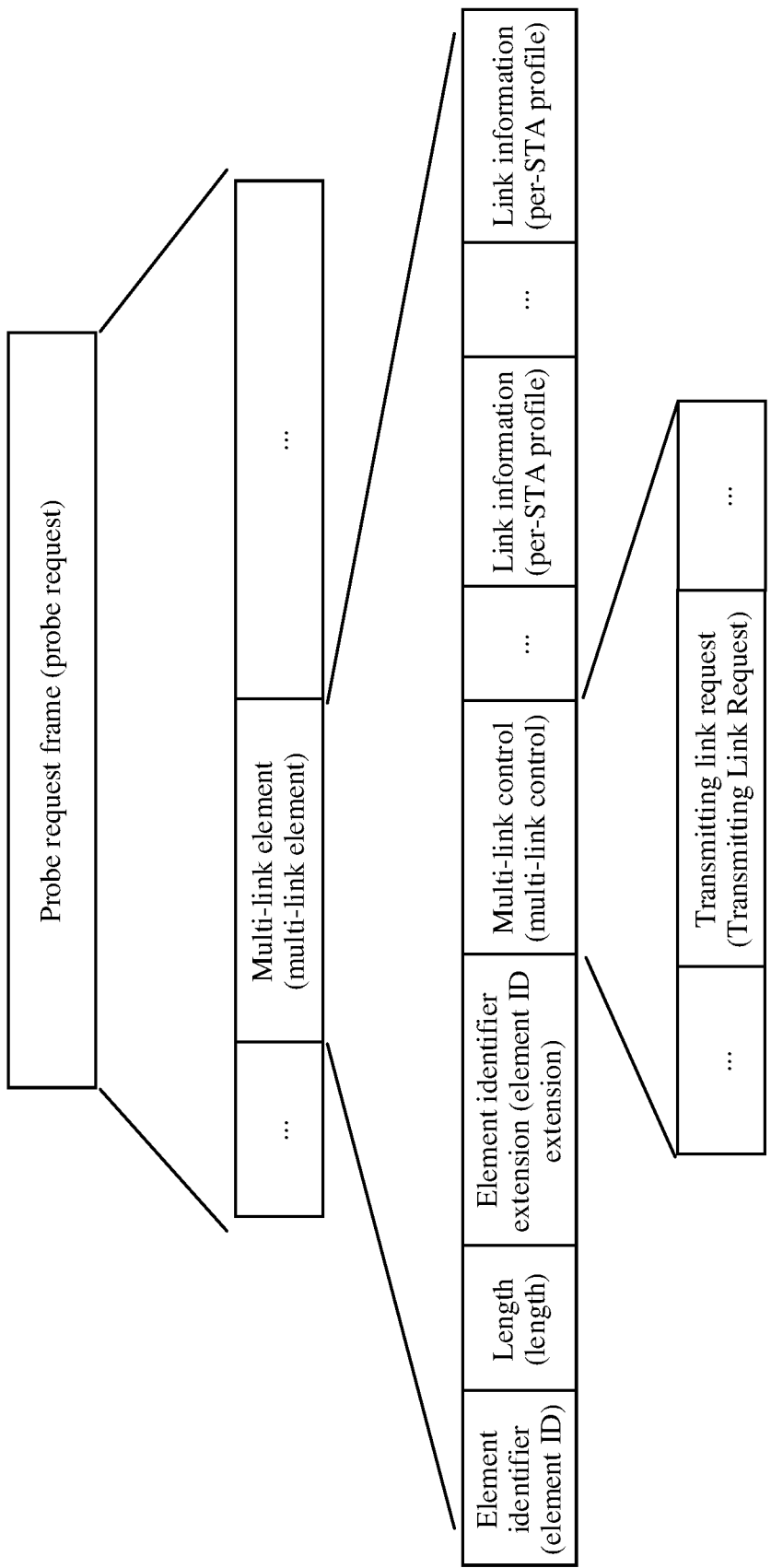
FIG. 4c to FIG. 4f each shows a schematic diagram of a structure of a probe request frame according to an embodiment of this application.
Figure 4D:
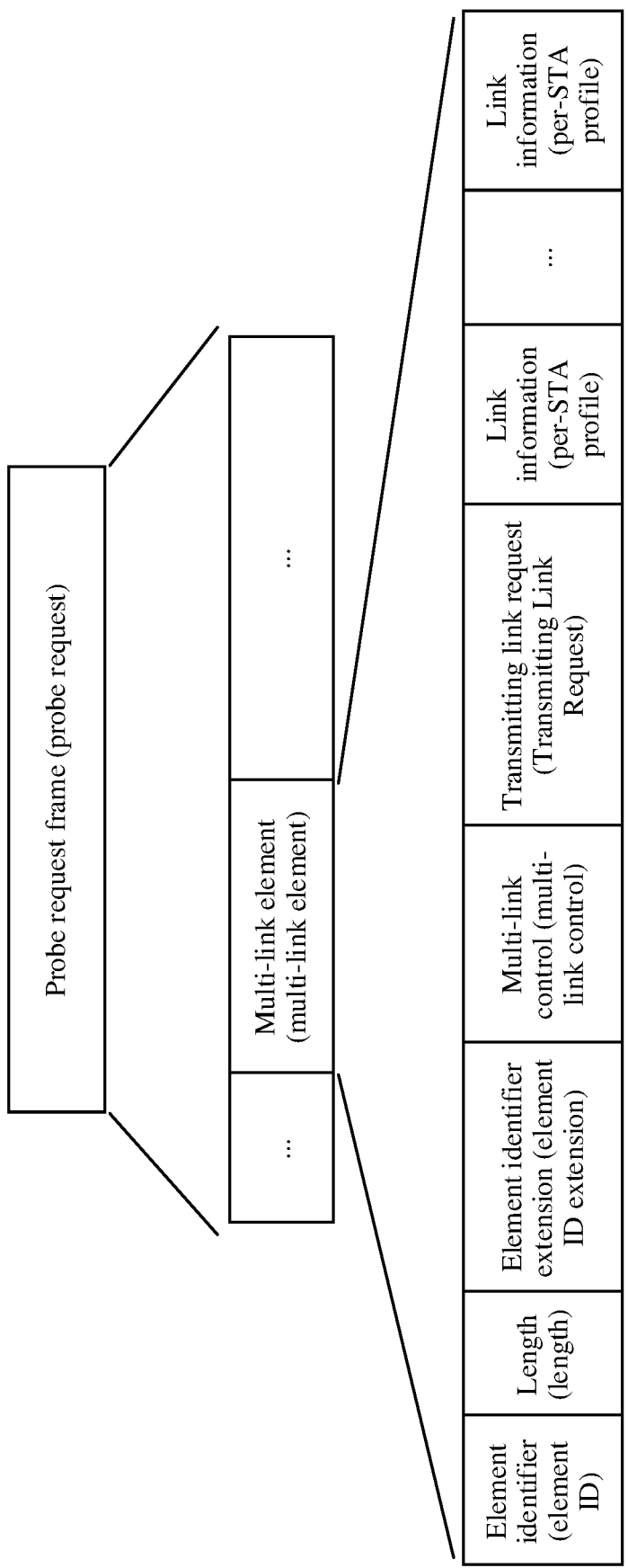

The eighth field is the Transmitting Link Request field in FIG. 4c or FIG. 4d, or may have another name. The eighth field may be indicated by using 1 bit. If the value of the eighth field is 0, it indicates that the link information corresponding to the transmitting link is not requested, or if the value of the eighth field is 1, it indicates that the link information corresponding to the transmitting link is requested. Alternatively, if the value of the eighth field is 1, it indicates that the link information corresponding to the transmitting link is not requested, or if the value of the eighth field is 0, it indicates that the link information corresponding to the transmitting link is requested.

In a third implementation, if a link information field of the first multi-link element of the probe request frame sent by the non-AP MLD on the transmitting link does not include link information of the transmitting link, it indicates by default that the link information corresponding to the transmitting link is not requested. If the non-AP MLD needs to indicate that the AP MLD requests the link information corresponding to the transmitting link, additional indication information is used for indication. For example, the eighth field is carried in the first multi-link element, to indicate that the probe request frame requests the link information of the transmitting link. The eighth field may be carried at any location outside the link information field. This is not limited in this embodiment of this application. For example, the eighth field may be carried in a multi-link control field, as shown in FIG. 4c, or the eighth field may be carried outside the multi-link control field, as shown in FIG. 4d.

The eighth field is the Transmitting Link Request field in FIG. 4c or FIG. 4d, or may have another name. In other words, if the eighth field does not appear, or another indication manner indicates that the eighth field does not appear, it indicates by default that the probe request frame does not request the link information of the transmitting link. When the eighth field appears, the eighth field may use 1 bit with a value of 0 or 1 to indicate that the probe request frame does not request the link information of the transmitting link.

In a fourth implementation, if a link information field of the first multi-link element of the probe request frame sent by the non-AP MLD on the transmitting link does not include link information of the transmitting link, it indicates by default that link information corresponding to the transmitting link is requested. If the non-AP MLD needs to indicate that the AP MLD does not request the link information corresponding to the transmitting link, additional indication information is used for indication. For example, a ninth field is carried in the first multi-link element, to indicate that the probe request frame does not request the link information of the transmitting link. The ninth field may be carried at any location outside the link information field. This is not limited in this embodiment of this application. For example, the ninth field may be carried in a multi-link control field, as shown in FIG. 4e, or the ninth field may be carried outside the multi-link control field, as shown in FIG. 4f.

Figure 4E:
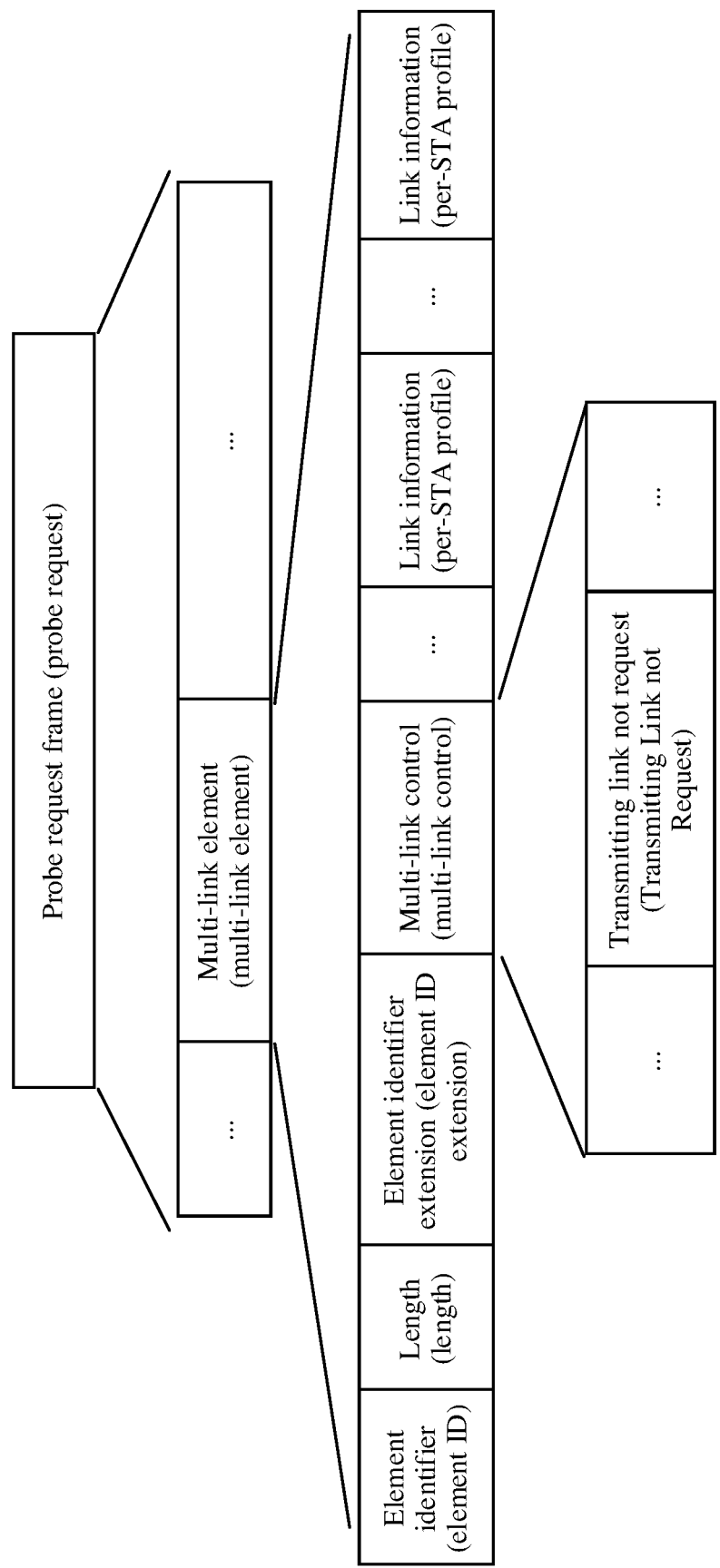
Figure 4F:
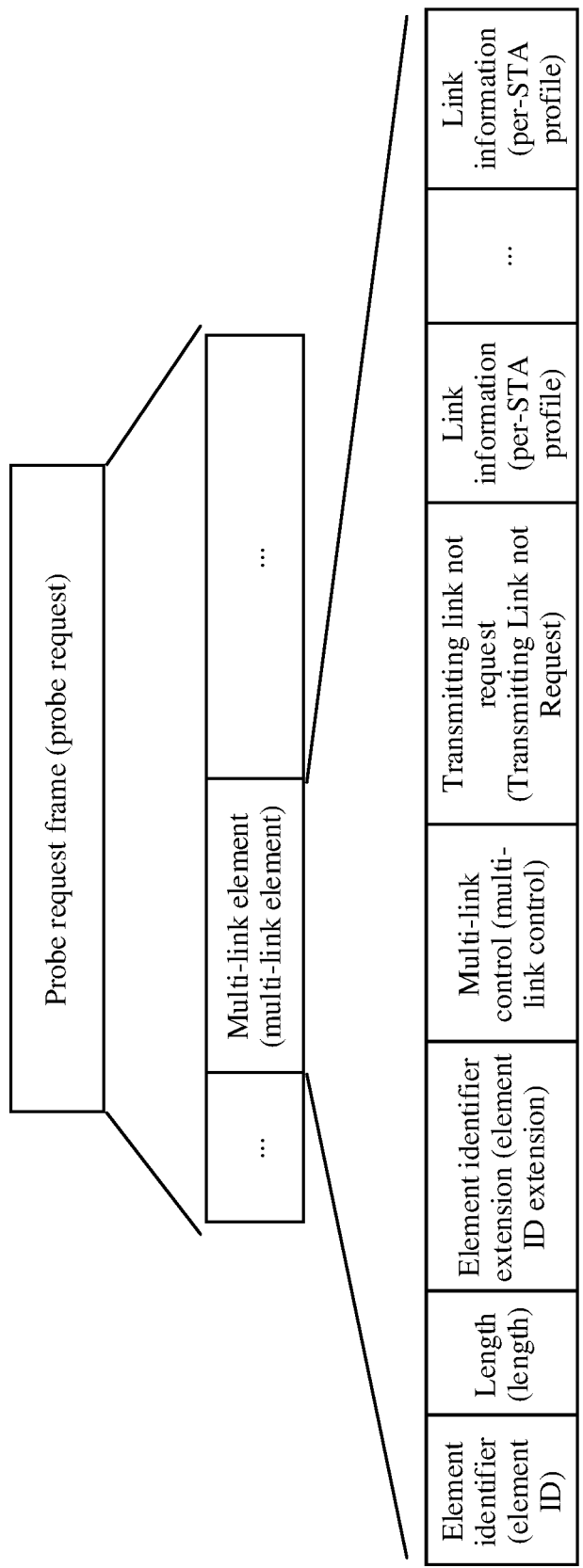

The ninth field is the Transmitting Link not Request field in FIG. 4e or FIG. 4f, or may have another name. In other words, if the ninth field does not appear, or another indication manner indicates that the ninth field does not appear, it indicates by default that the probe request frame requests the link information of the transmitting link. When the ninth field appears, the ninth field may use 1 bit with a value of 0 or 1 to indicate that the probe request frame does not request the link information of the transmitting link.

For an implementation of whether to request the complete link information of the transmitting link, refer to various implementations of whether to feed back complete link information for requested link information of a link in subsequent embodiments. In other words, the foregoing four implementations may be combined with subsequent embodiments without conflicts of the technical solutions. In subsequent embodiments, the link information that the probe request frame requests the AP MLD to feed back is not limited to the transmitting link or the non-transmitting link. Therefore, a manner of requesting complete information and partial information of a link described in subsequent embodiments is applicable to the non-transmitting link, and also applicable to the transmitting link.

Figure 5A:
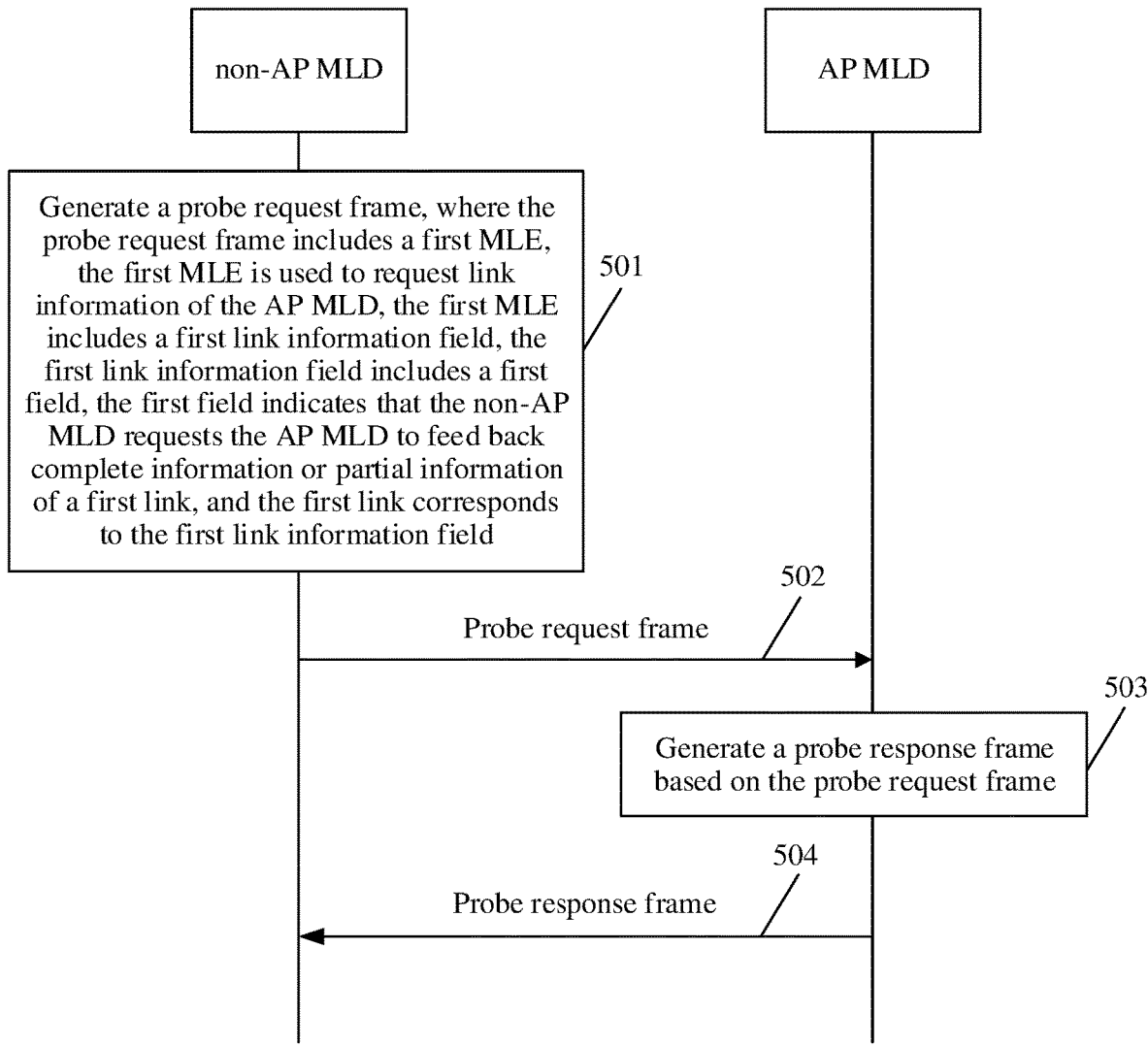
FIG. 5a and FIG. 5b each shows a schematic flowchart of a multi-link communication probe request method according to an embodiment of this application.

FIG. 5a is a schematic flowchart of a multi-link communication probe request method according to an embodiment of this application. As shown in FIG. 5a, the method includes the following steps.

501: A non-AP MLD generates a probe request frame, where the probe request frame includes a first multi-link element (a first MLE), the first multi-link element is used to request link information of an AP MLD, the first multi-link element includes a first link information field, the first link information field includes a first field, the first field indicates that the non-AP MLD requests the AP MLD to feed back complete information or partial information of a first link, and the first link corresponds to the first link information field.

In this embodiment of this application, that the first multi-link element is used to request link information of an AP MLD may be further understood as follows: The first multi-link element is used to indicate that the non-AP MLD requests the link information of the AP MLD. In addition, that the first field indicates that the non-AP MLD requests the AP MLD to feed back complete information or partial information of a first link may also be understood as follows: The first field is used to request the AP MLD to feed back the complete information or the partial information of the first link, or the first field is used to request the AP MLD to make the complete information or the partial information of the first link carried in the probe response frame, or the first field is used to request the AP MLD to feed back the complete information or the partial information of the first link and the like. In other words, the first field indicates the AP MLD to feed back the complete information or the partial information of the link (namely, the first link) identified by a link identifier field in the first link information field. The complete information indicates complete information elements or all information elements of the first link, and the partial information indicates a specific information element or a partial information element of the first link.

For example, when a value of the first field is a first value, the first field indicates that the non-AP MLD requests the AP MLD to feed back the complete information of the first link. When a value of the first field is a second value, the first field indicates that the non-AP MLD requests the AP MLD to feed back the partial information of the first link. The information element of the partial information may be indicated by a request element and/or an extended request element. Optionally, the information element of the partial information may be indicated by a request element (request element) and/or an extended request element (extended request element) in the first link information field. The request element and/or the extended request element may indicate an information element that is of the first link and that needs to be fed back by the AP MLD, and the like.

It may be understood that for specific descriptions of the request element and the extended request element, refer to FIG. 1b and FIG. 1c. Details are not described herein again. The first value and the second value are not specifically limited in this embodiment of this application.

For example, the first field may be a complete information (complete information) field in the link information field. For specific descriptions of the complete information field, refer to FIG. 8a to FIG. 8d described below. Alternatively, the first field may be a newly added field, for example, a request complete information (request complete information) field, in the link information field. For specific descriptions of the request complete information field, refer to FIG. 8e described below. Details are not described herein again.

A relationship between the first link and the first link information field may be shown in FIG. 1a. The first link information field may include a link identifier (link ID), and the link identifier may be understood as an identifier of the first link. The first link information field includes a link identifier, and the link identifier corresponds to the first link. Without loss of generality, that the first field indicates that the non-AP MLD requests the AP MLD to feed back complete information or partial information of a first link may also be referred to as: The first field indicates that the non-AP MLD requests the AP MLD to feed back complete information or partial information of a corresponding link. The corresponding link is a link corresponding to the first link information field.

In a possible implementation, for each link, complete information of the link indicates information that should be carried when a probe response frame of a single link is sent on the link. For example, the complete information of the link may include capabilities information, operation information, other information, and the like. For example, the complete information of the link may include the following information:

Timestamp and beacon interval fields (timestamp and beacon interval fields), direct sequence spread spectrum (direct sequence spread spectrum, DSSS) parameter set (DSSS parameter set), independent basic service set (independent basic service set, IBSS) parameter set (IBSS parameter set), country (Country), channel switch announcement (channel switch announcement), extended channel switch announcement (extended channel switch announcement), wide bandwidth channel switch (wide bandwidth channel switch), transmit power envelope (transmit power envelope), supported operating classes (supported operating classes), IBSS dynamic frequency selection (dynamic frequency selection, DFS), extended rate physical layer (extended rate physical layer, ERP) information (ERP information), high throughput (high throughput, HT) capabilities (HT capabilities), HT operation (HT operation), very high throughput (very high throughput, VHT) capabilities (VHT capabilities), VHT operation (VHT operation), extremely high throughput (extremely high throughput, EHT) capabilities (EHT capabilities), EHT operation (EHT operation), sub-1 GHz (sub-1 GHz) beacon compatibility (S1G beacon compatibility), short beacon interval (short beacon interval), S1G capabilities (S1G capabilities), and S1G operation (S1G operation (11ah)). In other words, when the non-AP MLD requests the AP MLD to feed back the complete information of the first link, the AP MLD may feed back the foregoing information elements of the first link. The partial information of the link indicates a part of the foregoing information elements.

In a possible implementation, the probe request frame may include a multi-link element for requesting the link information of the AP MLD. In other words, the probe request frame may not include a multi-link element for indicating link information of the non-AP MLD. Alternatively, when the probe request frame includes the multi-link element, it is assumed that a link information (per-STA profile) field of the multi-link element is only the multi-link element for requesting the link information of the AP MLD, and does not indicate the link information of the non-AP MLD.

In this implementation, the probe request frame includes only the multi-link element for requesting the link information of the AP MLD. The non-AP MLD may clearly indicate a probing target of the AP MLD. In addition, the multi-link element in the probe request frame does not indicate the link information of the non-AP MLD. This can reduce signaling overheads to an extent. It may be understood that for a structure of the probe request frame in this implementation, refer to FIG. 8a described below.

In another possible implementation, the probe request frame is only the multi-link element for requesting the link information of the AP MLD. The multi-link element includes a third field. A value of the third field is a third value. For a structure of the probe request frame in this implementation, refer to FIG. 8b described below. For specific descriptions of the third field, refer to the following descriptions. Details are not described herein again.

In still another possible implementation, in addition to the first multi-link element, the probe request frame may further include a second multi-link element. The second multi-link element may indicate the link information of the non-AP MLD. In other words, the second multi-link element carries the link information of the non-AP MLD.

In this case, the second multi-link element may include the second link information field. The second link information field corresponds to a second link. In other words, a link identifier in the second link information field is an identifier of the second link. The second link information field includes a second field. The second field indicates which one of complete information and partial information of the second link is carried by the non-AP MLD. The complete information indicates complete information elements or all information elements of the second link, and the partial information indicates a specific information element or a partial information element of the second link. For example, the second field may be a complete information field in the second link information field. For example, when a value of the second field is a first value, the second field indicates that the non-AP MLD carries the complete information of the second link. When a value of the second field is a second value, the second field indicates that the non-AP MLD carries the partial information of the second link. It may be understood that the first value and the second value described herein are merely examples, and the value of the second field may alternatively be different from the value of the first field. This is not limited in this embodiment of this application. For a structure of the probe request frame in this implementation, refer to FIG. 8c described below.

In this embodiment of this application, the first multi-link element includes one or more link information fields, and one link information field corresponds to one link. In addition, the second multi-link element may also include one or more link information fields, and one link information field corresponds to one link. Therefore, the one or more links corresponding to the first multi-link element may be completely the same as or completely different from the one or more links corresponding to the second multi-link element, or may be partially the same as the one or more links corresponding to the second multi-link element.

For example, the non-AP MLD has obtained link information of the third link. In this case, the non-AP MLD does not need to request the AP MLD to feed back the link information of the third link. Therefore, the one or more links corresponding to the first multi-link element may not include the third link. In other words, the AP MLD does not need to probe the third link again. In the foregoing implementation, the non-AP MLD may further flexibly select a link as a probe request object, to avoid that the AP MLD probes the foregoing some links again. This avoids resource waste.

In a possible implementation, the multi-link element may further include a third field. The third field may indicate a type of the multi-link element. The type of the multi-link element includes that the multi-link element indicates the link information of the non-AP MLD (namely, the link information of the non-AP MLD itself) or that the multi-link element is used to request the link information of the AP MLD (namely, the link information fed back by the AP MLD). For example, the third field may be included in a multi-link control (multi-link control) field. When the value of the third field is the third value, the type of the multi-link element is to request the link information of the AP MLD. When the value of the third field is a fourth value, the type of the multi-link element is to indicate the link information of the non-AP MLD.

In this case, the first multi-link element may include a first multi-link control field. The first multi-link control field may include the third field. The third field carries first type information (for example, the foregoing third value). In other words, the first type information indicates that the type of the first multi-link element is to request the link information of the AP MLD. The second multi-link element may include a second multi-link control field. The second multi-link control field may include the third field. The third field carries second type information (for example, the foregoing fourth value). In other words, the second type information indicates that the type of the second multi-link element is to indicate the link information of the non-AP MLD.

The foregoing manner of the third field may explicitly indicate the type of the multi-link element, so that the AP MLD clearly learns a meaning of a related field in the per-STA profile field.

It may be understood that the probe request frame may include one second multi-link element and one or more first multi-link elements. Each first multi-link element may indicate a different AP MLD. For example, the first multi-link element may include an identifier of the AP MLD. The identifier of the AP MLD indicates a different AP MLD. The identifier of the AP MLD may be an MLD MAC address of the AP MLD.

502: The non-AP MLD sends the probe request frame to the AP MLD.

Correspondingly, the AP MLD receives the probe request frame.

503: The AP MLD generates a probe response frame based on the probe request frame.

The AP MLD may generate the probe response frame based on the first multi-link element in the probe request frame. For example, when the probe request frame includes the first multi-link element, and the first field is used to request the AP MLD to feed back the complete information of the first link, the probe response frame may include the complete information of the first link. When the first field is used to request the AP MLD to feed back the partial information of the first link, the probe response frame may include the partial information of the first link.

504: The AP MLD sends the probe response frame to the non-AP MLD.

After the non-AP MLD receives the probe response frame, the non-AP MLD may obtain the link information of the AP MLD. Therefore, the non-AP MLD may establish multi-link communication with the AP MLD and perform other processes. Therefore, the non-AP MLD may perform data and/or signaling exchange with the AP MLD.

Figure 5B:
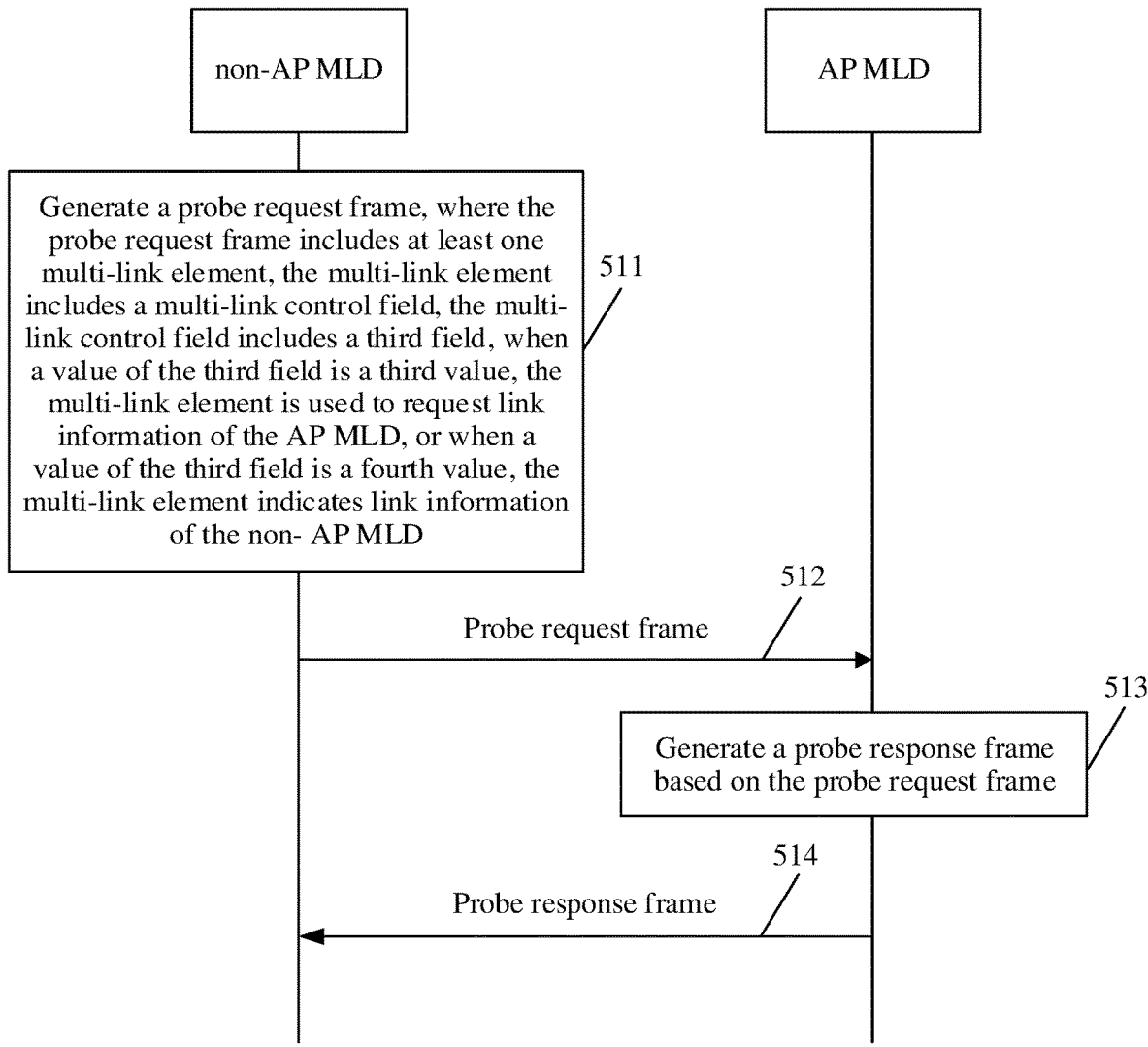

Based on the method shown in FIG. 5a, an embodiment of this application further provides another method. FIG. 5b is a schematic flowchart of a multi-link communication probe request method according to an embodiment of this application. As shown in FIG. 5b, the method includes the following steps.

511: A non-AP MLD generates a probe request frame, where the probe request frame includes at least one multi-link element, the multi-link element includes a multi-link control (multi-link control) field, the multi-link control field includes a third field, when a value of the third field is a third value, the multi-link element is used to request link information of an AP MLD, or when a value of the third field is a fourth value, the multi-link element indicates link information of the non-AP MLD.

In other words, the third field may indicate a type of the multi-link element.

For example, multi-link elements included in the probe request frame may be of a same type. For example, the probe request frame may include only a first multi-link element. For another example, the probe request frame may include only a second multi-link element. For example, the multi-link elements included in the probe request frame may alternatively be of different types. For example, the probe request frame may include both a first multi-link element and a second multi-link element.

In a possible implementation, the multi-link element further includes a link information field. The link information field includes a fourth field. When the multi-link element is used to request the link information of the AP MLD, the fourth field indicates that the non-AP MLD requests the AP MLD to feed back complete information or partial information of a first link. When the multi-link element indicates the link information of the non-AP MLD, the fourth field indicates that the non-AP MLD carries the complete information or the partial information of the first link. The link information field corresponds to the first link. In other words, a link identifier (link ID) included in the link information field may be an identifier of the first link.

For example, when a value of the fourth field is a first value, the fourth field indicates that the non-AP MLD requests the AP MLD to feed back the complete information of the first link. When a value of the fourth field is a second value, the fourth field indicates that the non-AP MLD requests the AP MLD to feed back the partial information of the first link. An information element of the partial information may be indicated by a request element and/or an extended request element in the link information field. Alternatively, an information element of the partial information may be indicated by a request element and/or an extended request element other than the multi-link element in the probe request frame. For example, the fourth field may be a complete information field in the link information field.

It may be understood that when the multi-link element is used to request the link information of the AP MLD, the fourth field may be understood as the foregoing first field in FIG. 5a. Alternatively, when the multi-link element indicates the link information of the non-AP MLD, the fourth field may be understood as the foregoing second field in FIG. 5a.

It may be understood that for descriptions of the first multi-link element, the second multi-link element, the fourth field, the type of the multi-link element, and the like, refer to the method shown in FIG. 5a. Details are not described herein again.

512: The non-AP MLD sends the probe request frame to the AP MLD.

513: The AP MLD generates a probe response frame based on the probe request frame.

The AP MLD generates the probe response frame based on the third field, or the AP MLD generates the probe response frame based on the third field and the fourth field.

514: The AP MLD sends the probe response frame to the non-AP MLD.

It may be understood that for specific descriptions of the method shown in FIG. 5b, refer to the method shown in FIG. 5a, or refer to FIG. 8a to FIG. 8c described below. Details are not described herein again.

In this embodiment of this application, based on the first field, the non-AP MLD may clearly indicate which one of the complete information and the partial information of the link is fed back by the AP MLD, and the AP MLD accurately learns of the link information that needs to be fed back by the AP MLD. This improves information exchange efficiency. In addition, types of the MLEs are distinguished, so that the non-AP MLD more flexibly selects an MLE to feed back link information or to request link information.

Figure 6A:
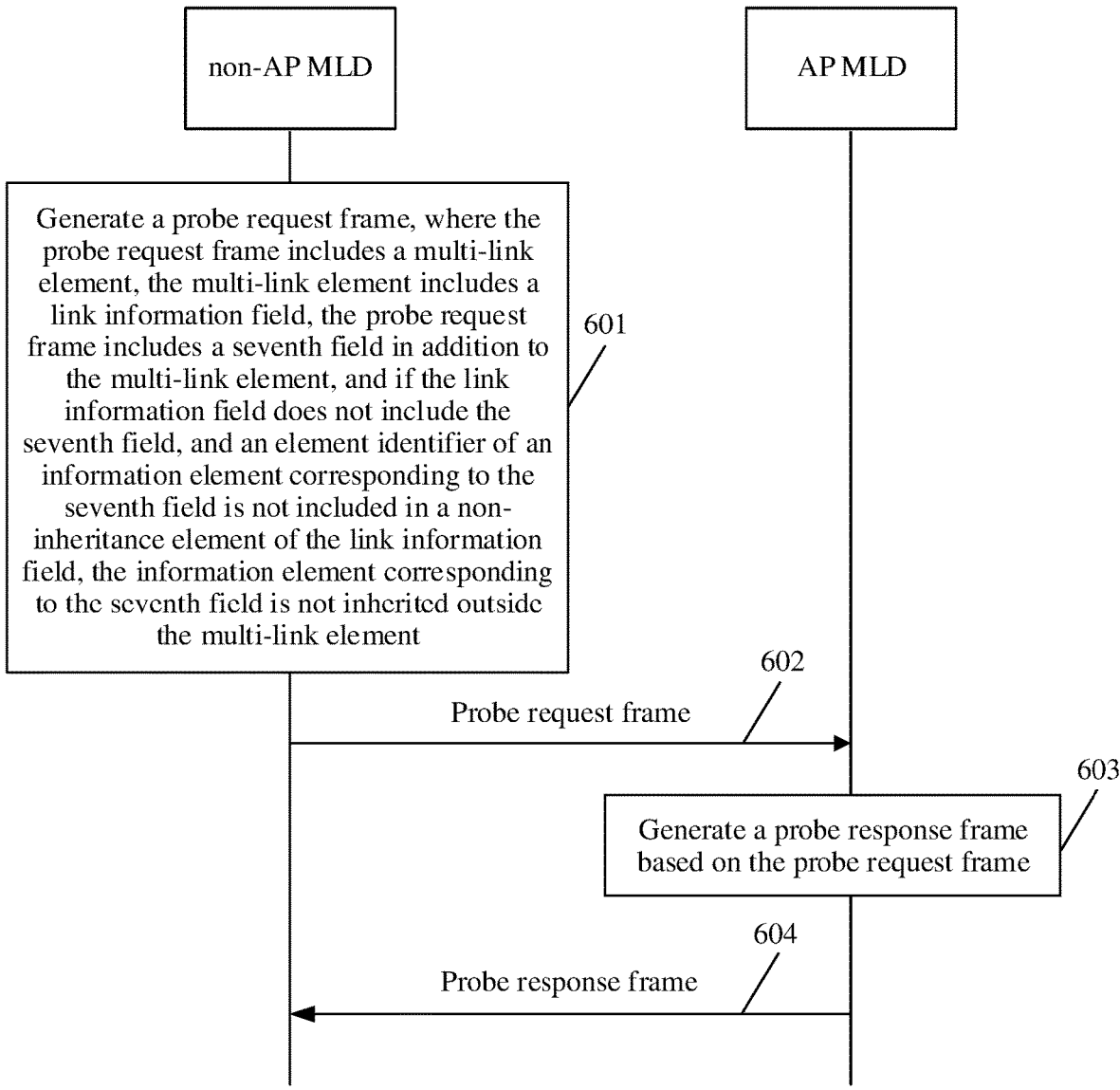
FIG. 6a and FIG. 6b each shows a schematic flowchart of a multi-link communication probe request method according to an embodiment of this application.

FIG. 6a is a schematic flowchart of a multi-link communication probe request method according to an embodiment of this application. As shown in FIG. 6a, the method includes the following steps.

601: A non-AP MLD generates a probe request frame, where the probe request frame includes a multi-link element, the multi-link element includes a link information field, and the probe request frame includes a seventh field in addition to the multi-link element. If the link information field does not include the seventh field, and an element identifier of an information element corresponding to the seventh field is not included in a non-inheritance element of the link information field, the information element corresponding to the seventh field is not inherited outside the multi-link element.

In this embodiment of this application, the multi-link element may be used only to request link information of an AP MLD. Alternatively, the multi-link element includes a third field, and a value of the third field is a third value.

That the information element corresponding to the seventh field is not inherited outside the multi-link element may also be understood as follows: Content of the information element corresponding to the seventh field is not inherited outside the multi-link element, or the link information field does not include the information element corresponding to the seventh field.

In other words, when the multi-link element is included in the probe request frame, for an information element, even if the information element is included in the probe request frame outside the MLE and is not included in a link information (per-STA profile) field of the MLE, and an element identifier (element ID) of the information element is not included in a non-inheritance element in the link information field, it is not considered that the per-STA profile field includes the information element. As shown in FIG. 6c, the element ID described herein may be an element ID of a request element, an element ID of an extended request element, an element ID of an HT capabilities element, or the like.

Alternatively, when the MLE is included in the probe request frame, if an information element is included in the probe request frame outside the MLE and is not included in a link information field of the MLE, the link information field does not include the information element (or it is not considered that the link information field includes content of the information element), unless an element identifier of the information element is included in a non-inheritance element in the link information field.

Alternatively, when the MLE is included in the probe request frame, if an information element is included in the probe request frame outside the MLE and is not included in a per-STA profile field corresponding to a link, and an element ID of the information element is not included in a non-inheritance element in the per-STA profile field, an information element on the link may be different from an information element on a transmitting link.

Correspondingly, when the multi-link element is included in the probe request frame, if an information element is included in the probe request frame outside the multi-link element and is included in a per-STA profile field of the multi-link element, the information element in the per-STA profile field is used. In other words, the AP MLD may use the information element in the per-STA profile field.

For example, the seventh field described herein may include a fifth field described below. For example, if the fifth field is included in the probe request frame outside the multi-link element and is not included in the link information field, the link information field does not include the fifth field. The link information field is used to request complete information of a first link. The first link is a link identified by a link identifier field in the link information field.

In addition to the fifth field, the information element corresponding to the seventh field may further include any one or more of the following: a high throughput (high throughput, HT) capabilities element (HT capabilities element), a very high throughput (very high throughput, VHT) capabilities element (VHT capabilities element), an extremely high throughput (extremely high throughput, EHT) capabilities element (EHT capabilities element), an HT operation element (HT operation element), a VHT operation element (VHT operation element), and an EHT operation element (EHT operation element). It may be understood that the information element described herein is merely an example, and more information elements may be included during specific implementation. Details are not described herein again.

As shown in FIG. 6c, for example, the information element corresponding to the seventh field is a request element, an extended request element, and an HT capabilities element. With reference to the method shown in FIG. 6a, an element (referred to as a non-multi-link element in FIG. 6c) other than the MLE in the probe request frame includes a request element, an extended request element, and an HT capabilities element. When the link information field does not include the request element and the extended request element, the link information field is used to request the complete information of the first link. When the link information field does not include the HT capabilities element, an HT capabilities element corresponding to the first link is not inherited from the transmitting link (namely, a link for sending the multi-link element). For example, it may indicate that the non-AP MLD does not add, to the probe request frame, the HT capabilities element corresponding to the first link. For another example, it may also indicate that the HT capabilities element corresponding to the first link may be different from an HT capabilities element corresponding to the transmitting link. When the link information field includes the foregoing information elements, regardless of content of the information elements other than the MLE, the AP MLD uses content of the three information elements included in the link information field for content of information elements of the first link.

With reference to FIG. 5a and FIG. 5b described above, in a possible implementation, the multi-link element in this embodiment of this application may be used only to request the link information of the AP MLD.

In another possible implementation, the multi-link element may include a third field. When a value of the third field is a third value, the multi-link element is used to request the link information of the AP MLD.

602: The non-AP MLD sends the probe request frame to the AP MLD.

Correspondingly, the AP MLD receives the probe request frame.

603: The AP MLD generates a probe response frame based on the probe request frame.

604: The AP MLD sends the probe response frame to the non-AP MLD.

It may be understood that for a specific implementation of the method shown in FIG. 6a, refer to FIG. 5a and/or FIG. 5b described above. Details are not described herein again.

In a possible implementation, an embodiment of this application further provides a multi-link communication probe request method, as described below:

A non-AP MLD generates a first frame, and then sends the first frame to an AP MLD. Correspondingly, the AP MLD receives the first frame, and processes the first frame. For example, the first frame may be an association request frame, a probe request frame, or the like.

Alternatively, an AP MLD generates a first frame, and then sends the first frame to a non-AP MLD. Correspondingly, the non-AP MLD receives the first frame, and processes the first frame. For example, the first frame may be an association response frame, a probe response frame, a beacon frame, or the like.

In an implementation, the first frame includes a multi-link element. The multi-link element includes a third field. A value of the third field is a fourth value. When the first frame includes a seventh field in addition to the multi-link element, a link information field of the multi-link element does not include the seventh field, and an element identifier of an information element corresponding to the seventh field is not included in a non-inheritance element in the link information field, the information element corresponding to the seventh field is inherited from the first frame outside the multi-link element.

In other words, when the multi-link element is included in the first frame, for an information element, even if the information element is included in the probe request frame outside the MLE and is not included in a link information (per-STA profile) field of the MLE, and an element identifier (element ID) of the information element is not included in a non-inheritance element in the link information field, it may be considered that the per-STA profile field includes the information element.

In another implementation, the first frame includes a multi-link element. The multi-link element includes a link information field. The link information field includes first indication information; or the multi-link element includes first indication information. When the first frame includes a seventh field in addition to the multi-link element, the link information field does not include the seventh field, and an element identifier of an information element corresponding to the seventh field is not included in a non-inheritance element of the link information field, the information element corresponding to the seventh field is not inherited outside the multi-link element.

In other words, when the foregoing condition is met, the first indication information may indicate that the information element corresponding to the seventh field is not inherited outside the multi-link element. It may be understood that the foregoing condition means that the first frame includes the seventh field in addition to the multi-link element, the link information field does not include the seventh field, and the element identifier of the information element corresponding to the seventh field is not included in the non-inheritance element of the link information field. Optionally, the first indication information may be separately located in one or more link information fields included in the multi-link element. Therefore, the first indication information may indicate that when the one or more link information fields meet the foregoing condition, the information element corresponding to the seventh field is inherited from the multi-link element. Alternatively, the first indication information may be located in the multi-link element. Therefore, the first indication information uniformly indicates that when the one or more link information fields meet the foregoing condition, the information element corresponding to the seventh field is inherited from the multi-link element.

For example, the multi-link element shown in FIG. 6a may include the first indication information, to clearly indicate (namely, explicitly indicate), to the AP MLD, whether the information element corresponding to the seventh field is inherited outside the multi-link element. For example, the first indication information may be 1 bit. For example, the first indication information is a ninth value (for example, 1). This is not limited in this embodiment of this application.

It may be understood that for other descriptions of the seventh field, refer to FIG. 6a. Details are not described herein again.

Figure 6B:
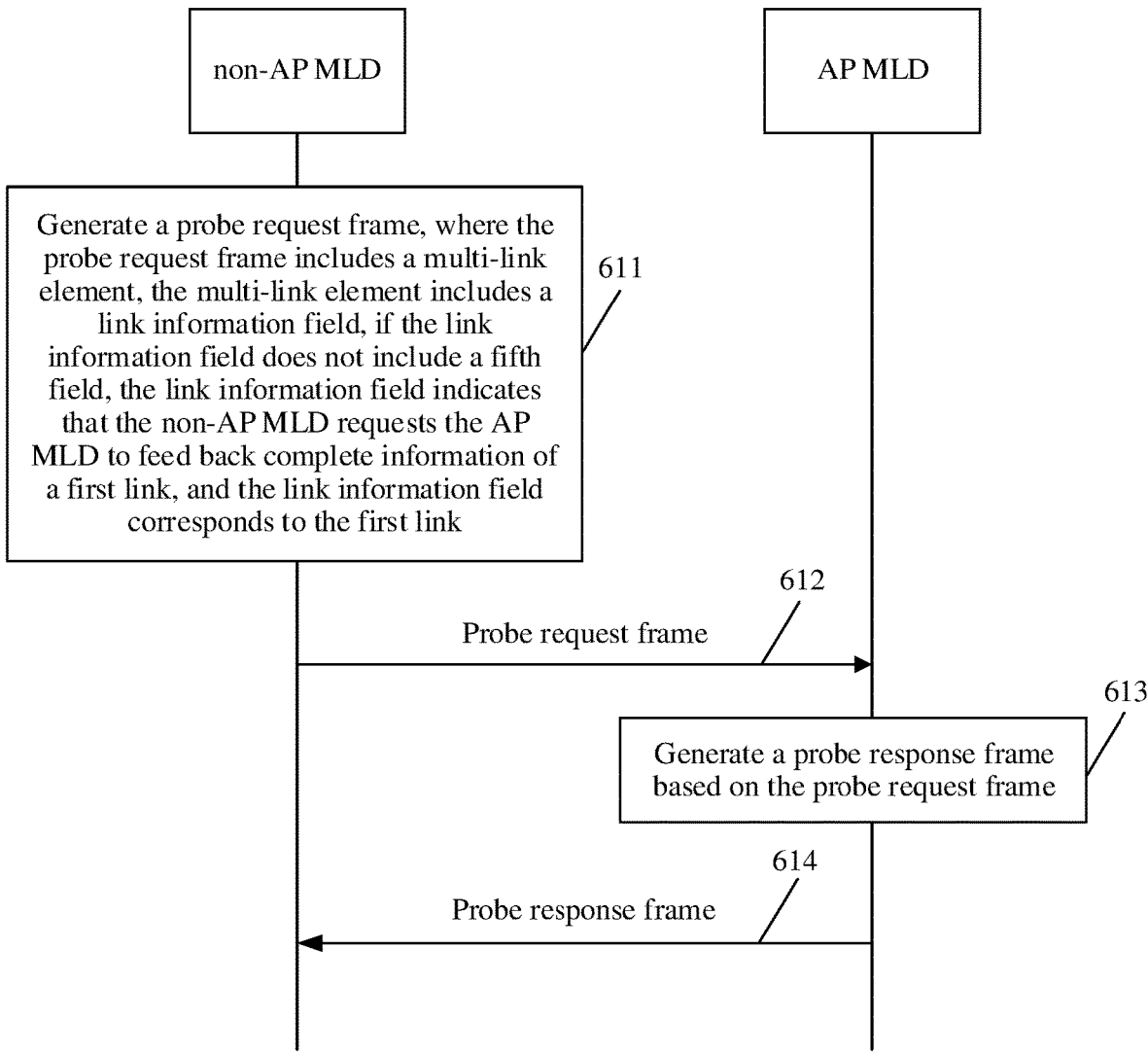
Figure 6C:
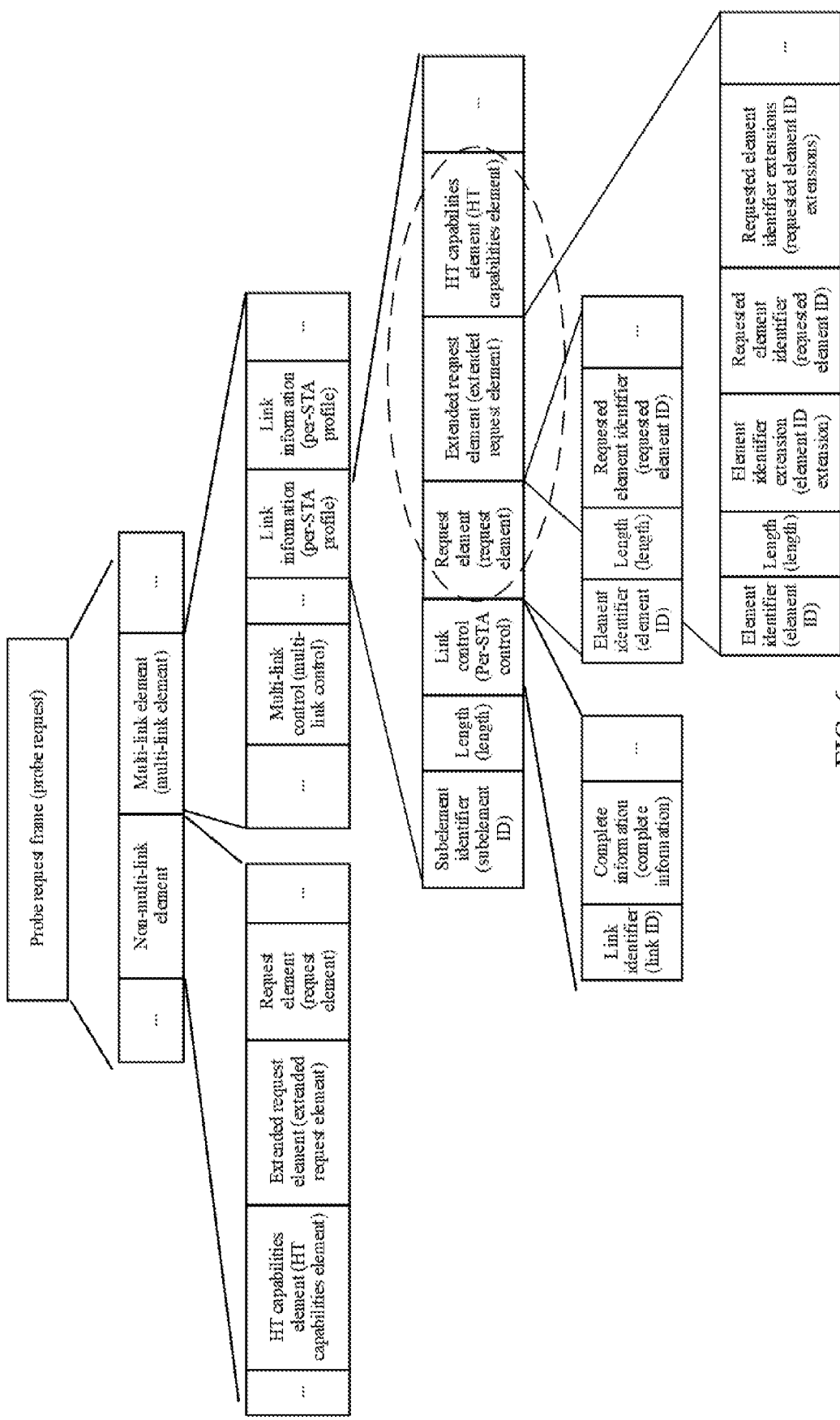
FIG. 6c is a schematic diagram of a structure of a probe request frame according to an embodiment of this application.

FIG. 6b is a schematic flowchart of a multi-link communication probe request method according to an embodiment of this application. As shown in FIG. 6b, the method includes the following steps.

611: A non-AP MLD generates a probe request frame, where the probe request frame includes a multi-link element, the multi-link element includes a link information field, if the link information field does not include a fifth field, the link information field indicates that the non-AP MLD requests an AP MLD to feed back complete information of a first link, and the link information field corresponds to the first link.

The fifth field indicates an information element of the first link. In other words, the fifth field may indicate a partial information element that is of the first link and that is fed back by the AP MLD. For example, the fifth field may be a request element (request element) field and/or an extended request element (extended request element) field.

It may be learned from FIG. 1a to FIG. 1c that when the link information field does not carry a request element, there may be the following two understanding manners.

In a first manner, due to an inheritance structure of the multi-link element, the link information field may not carry an information element the same as that of a transmitting link. Therefore, when the link information field does not carry the request element, it indicates that the information element of the first link is the same as the information element of the transmitting link. The transmitting link is a link for sending the multi-link element, and the link information field corresponds to the first link.

In a second manner, when the link information field does not carry the request element, it indicates that the non-AP MLD requests the AP MLD to feed back the complete information of the first link.

Due to the foregoing two understanding manners, when the probe request frame carries the request element, and the link information field does not carry the request element, the AP MLD cannot accurately learn of which one of the partial information and the complete information of the first link is fed back. It may be understood that for descriptions of an extended request element, refer to the descriptions of the request element described herein. Details are not described again in this embodiment of this application. For example, when the link information field does not carry the request element, and does not carry the extended request element, the link information field may be understood in the foregoing two manners.

Therefore, in this embodiment of this application, a manner of understanding that the link information field does not carry the request element or the extended request element is determined. To be specific, provided that the link information field does not carry the request element or the extended request element, it indicates that the non-AP MLD requests the AP MLD to feed back the complete information of the first link.

When the link information field carries at least one of the request element or the extended request element, it indicates that the non-AP MLD requests the AP MLD to feed back the partial information of the first link. When the link information field does not carry the request element and the extended request element, it indicates that the non-AP MLD requests the AP MLD to feed back the complete information of the first link.

In general, when a link information (per-STA profile) field of the multi-link element (MLE) in the probe request (probe request) frame does not carry the request element (request element) and the extended request element (extended request element), it indicates that the non-AP MLD requests to probe the complete information of the first link. When the per-STA profile field of the MLE in the probe request frame carries the request element and/or the extended request element, it indicates that the non-AP MLD requests to probe the partial information of the first link. An element ID of an information element of the partial information is indicated by the request element and/or the extended request element carried in the per-STA profile field of the MLE. For descriptions of the element ID of the information element of the partial information, refer to FIG. 8a to FIG. 8d described below.

In other words, when the per-STA profile field of the MLE in the probe request frame does not carry the request element and the extended request element, and the probe request frame includes the request element and/or the extended request element other than the MLE, the request element and the extended request element of a corresponding link are not inherited from the request element and/or the extended request element other than the MLE.

With reference to the method shown in FIG. 5a, as shown in FIG. 5a, the multi-link element included in the probe request frame may be used only to request the link information of the AP MLD. Alternatively, the probe request frame may include different types of multi-link elements.

That the link information field of the multi-link element does not carry the request element is understood in the following manners.

In a first manner, when the multi-link element included in the probe request frame is used only to request the link information of the AP MLD, and the link information field of the multi-link element in the probe request frame does not include the request element or the extended request element, the link information field is used to request the complete information of the first link.

In a second manner, when the probe request frame includes different types of multi-link elements, for example, the first multi-link element and the second multi-link element, the first multi-link element is used to request the link information of the AP MLD, and the second multi-link element is used to indicate the link information of the non-AP MLD. The link information field is further understood as follows:

A: When the link information field of the first multi-link element does not include the request element and the extended request element, the link information field (which may also be understood as the first link information field described above) is used to request the AP MLD to feed back the complete information of the first link.

B: When the link information field of the second multi-link element does not include the request element and the extended request element, the link information field (which may also be understood as the second link information field described above) is used to indicate that the information element of the first link is the same as the information element of the transmitting link. In addition, it may also indicate that the non-AP MLD requests the AP MLD to feed back the complete information of the first link. In this case, the link information field may have an inheritance structure.

If the probe request frame may include different types of multi-link elements, the multi-link element further includes a third field. The third field indicates a type of the multi-link element. The type of the multi-link element includes: The multi-link element indicates the link information of the non-AP MLD (for example, the second multi-link element), or the multi-link element is used to request the link information of the AP MLD (for example, the first multi-link element). It may be understood that for specific descriptions of the third field and the type of the multi-link element, refer to the foregoing embodiment and the like. Details are not described herein again.

With reference to the foregoing embodiment, when the value of the third field is the third value, and the link information field does not include the fifth field, the link information field indicates that the non-AP MLD requests the AP MLD to feed back the complete information of the first link. In this case, the multi-link element does not have an inheritance structure. When the value of the third field is the fourth value, and the link information field does not include the fifth field, the link information field may be understood in the foregoing manner B.

Optionally, the value of the third field may be different from the value in the foregoing embodiment. For example, the value of the third field is a seventh value, and the multi-link element is used to request the link information of the AP MLD. In addition, when the link information field does not include the fifth field, the link information field indicates that the non-AP MLD requests the AP MLD to feed back the complete information of the first link. In other words, the link information field may be understood in the foregoing manner A. When the value of the third field is an eighth value, the multi-link element indicates the link information of the non-AP MLD. In addition, when the link information field does not include the fifth field, the link information field indicates that the non-AP MLD requests the AP MLD to feed back the complete information of the first link. When the value of the third field is a ninth value, the multi-link element indicates the link information of the non-AP MLD. In addition, when the link information field does not include the fifth field, the link information field may be understood in the foregoing manner B.

It may be understood that the request element and/or the extended request element included in the fifth field described in this embodiment of this application are/is merely an example. During specific implementation, the link information field may further include another field having an inheritance structure. A function of the another field having an inheritance structure may be similar to a function of the request element and/or the extended request element.

In the foregoing embodiment, the value of the third field is described with reference to understanding of the link information field. An embodiment of this application further provides a method. For example, the multi-link element further includes second indication information. The second indication information indicates that if the link information field included in the multi-link element does not include the fifth field, the link information field indicates that the non-AP MLD requests the AP MLD to feed back the complete information of the first link.

Therefore, regardless of whether the multi-link element is understood in the foregoing first manner or the foregoing second manner, provided that the multi-link element includes the second indication information, the link information field indicates that the non-AP MLD requests the AP MLD to feed back the complete information of the first link.

For this implementation, there may be the following two manners with reference to the type of the multi-link element and the like.

Manner 1: The multi-link element included in the probe request frame is used only to request the link information of the AP MLD. When the multi-link element includes the second indication information, and the link information field included in the multi-link element does not include the fifth field, the link information field indicates that the non-AP MLD requests the AP MLD to feed back the complete information of the first link. Alternatively, when the multi-link element does not include the second indication information, and the link information field included in the multi-link element does not include the fifth field, the link information field indicates that the information element of the first link is the same as the information element of the transmitting link. In other words, the multi-link element described herein has an inheritance structure.

Manner 2: The probe request frame includes the first multi-link element and the second multi-link element. For descriptions of the first multi-link element and the second multi-link element, refer to the foregoing embodiment. Details are not described herein again. When the first multi-link element includes the second indication information, and the first link information field included in the first multi-link element does not include the fifth field, the first link information field indicates that the non-AP MLD requests the AP MLD to feed back the complete information of the first link. Alternatively, when the first multi-link element does not include the second indication information, and the first link information field does not include the fifth field, the first link information field indicates that the information element of the first link is the same as the information element of the transmitting link. It may be understood that for descriptions of the second multi-link element, refer to the descriptions of the first multi-link element. Details are not described herein again.

The second indication information described herein may be a field in the multi-link element or the like. This is not limited in this embodiment of this application. A quantity of bits occupied by the second indication information and a specific value are not limited in this embodiment of this application.

612: The non-AP MLD sends the probe request frame to the AP MLD.

Correspondingly, the AP MLD receives the probe request frame.

613: The AP MLD generates a probe response frame based on the probe request frame.

614: The AP MLD sends the probe response frame to the non-AP MLD.

This embodiment of this application mainly describes a manner in which the link information field does not include the fifth field. However, when the link information field includes the fifth field, the link information field is used to request the AP MLD to feed back the information element that is of the first link and that is indicated by the fifth field. In other words, the link information field does not request the information element that is of the first link and that is indicated by the fifth field outside the multi-link element in the probe request frame.

It may be understood that for other descriptions of the method shown in FIG. 6b, refer to other embodiments described in this application. Details are not described herein again.

In this embodiment of this application, whether the link information field includes the fifth field is determined, so that the non-AP MLD may clearly indicate which one of the complete information and the partial information of the link is fed back by the AP MLD, and the AP MLD accurately learns of the link information that needs to be fed back by the AP MLD. This improves information exchange efficiency.

It may be learned from the multi-link element described in FIG. 1a that the multi-link element may be used to carry link information of a multi-link device that sends the multi-link element, and the multi-link element may further indicate link information required by the multi-link device that sends the multi-link element. In other words, the multi-link element may further indicate a target probe request link. However, the multi-link element usually carries information about all links supported by the non-AP MLD. As a result, the non-AP MLD uses all the links supported by the non-AP MLD as probing targets, and the AP MLD needs to probe all the links. However, the non-AP MLD may have obtained information of some links. Therefore, the non-AP MLD does not need to request the information of these links again in the probe request frame. In other words, the multi-link element shown in FIG. 1a makes it impossible for the non-AP MLD to flexibly select a specific link as a probe request object. Consequently, the probe response frame carries redundant information. This causes resource waste.

In view of this, an embodiment of this application further provides a multi-link communication probe request method. According to the method, the non-AP MLD may flexibly select one or more links as a probe request object, and also effectively reduce system resource waste.

For an application scenario of the multi-link communication probe request method provided in this application, refer to FIG. 2*a* and/or FIG. 2*b*. For the AP MLD, the non-AP MLD, and the like in the method provided in this application, refer to FIG. 3*a* to FIG. 3*c*, FIG. 4*a* and/or FIG. 4*b*, and the like. Details are not described herein again.

Figure 7A:
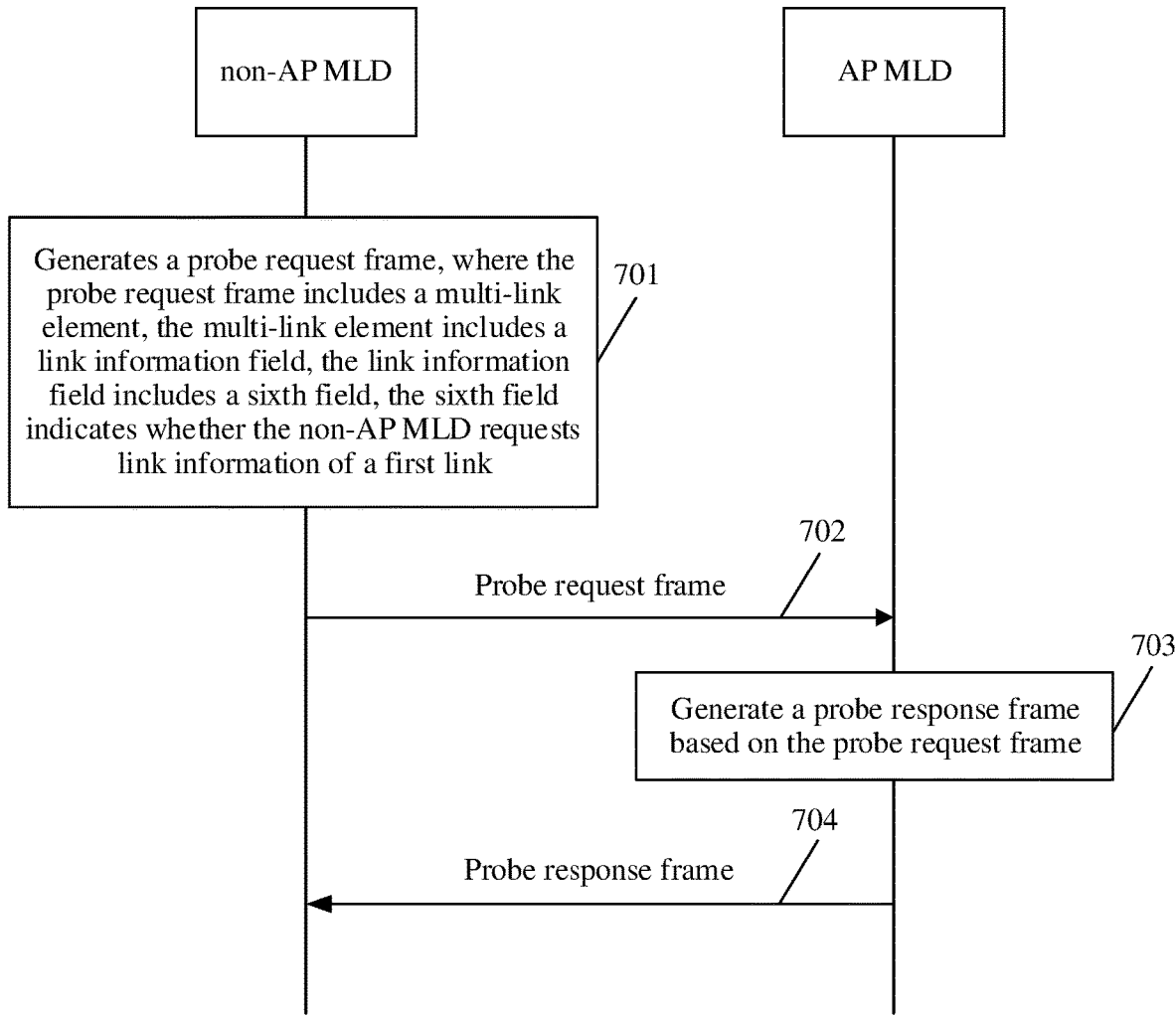
FIG. 7a is a schematic flowchart of a multi-link communication probe request method according to an embodiment of this application.

FIG. 7*a* is a schematic flowchart of another multi-link communication probe request method according to an embodiment of this application. As shown in FIG. 7*a*, the method includes the following steps.

701: A non-AP MLD generates a probe request frame, where the probe request frame includes a multi-link element, the multi-link element includes a link information field, the link information field includes a sixth field, the sixth field indicates whether the non-AP MLD requests link information of a first link.

For example, when a value of the sixth field is a fifth value, the sixth field indicates that the non-AP MLD requests the link information of the first link. In other words, the sixth field indicates that the non-AP MLD requests an AP MLD to feed back the link information of the first link, or the sixth field indicates that the non-AP MLD requests the AP MLD to make the link information of the first link carried in a probe response frame.

Alternatively, when a value of the sixth field is a sixth value, the sixth field indicates that the non-AP MLD does not request the link information of the first link. In other words, the sixth field indicates that the non-AP MLD requests an AP MLD not to feed back the link information of the first link, or the sixth field indicates that the non-AP MLD requests the AP MLD not to make the link information of the first link carried in a probe response frame. In this case, the link information field is used to carry the link information of the non-AP MLD on the first link.

Figure 7B:
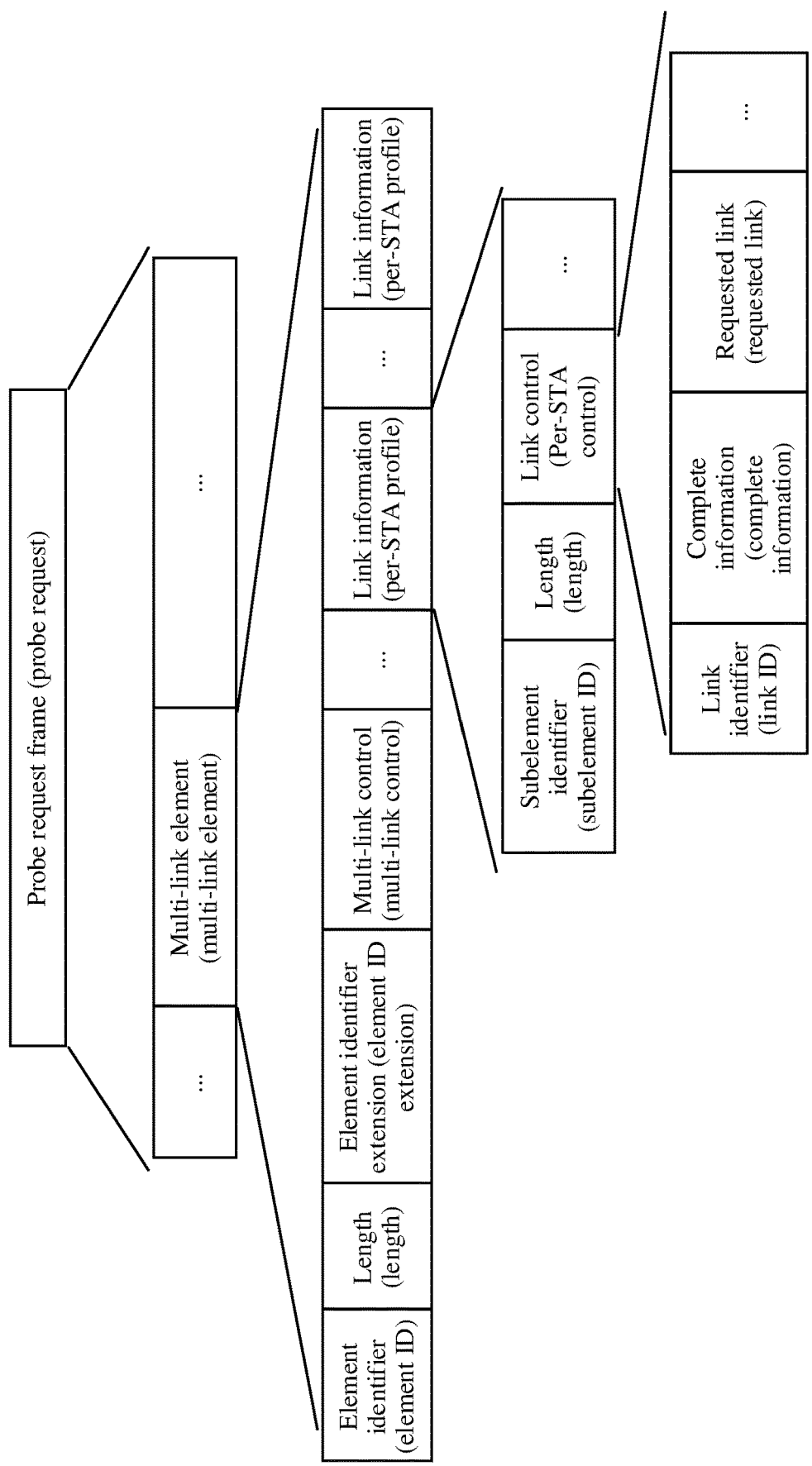
FIG. 7b is a schematic diagram of a structure of a probe request frame according to an embodiment of this application.

FIG. 7*b* is a schematic diagram of a structure of a probe request frame according to an embodiment of this application. As shown in FIG. 7*b*, a requested link (requested link) field in FIG. 7*b* may be understood as the sixth field. For specific descriptions of the requested link field, refer to the descriptions of the sixth field. Details are not described herein again.

It may be understood that for other descriptions of the probe request frame in FIG. 7*b*, refer to FIG. 1*a*. Details are not described herein again.

702: The non-AP MLD sends the probe request frame to the AP MLD.

Correspondingly, the AP MLD receives the probe request frame.

703: The AP MLD generates the probe response frame based on the probe request frame.

The AP MLD may generate the probe response frame based on the sixth field. For example, if the sixth field indicates that the non-AP MLD does not request the link information of the first link, the probe response frame may not include the link information of the first link.

704: The AP MLD sends the probe response frame to the non-AP MLD.

In this embodiment of this application, the multi-link element indicates link information of the non-AP MLD, and is also used to request link information of the AP MLD. Alternatively, the multi-link element may be used only to request link information of the AP MLD or the like. A specific type of the multi-link element is not limited in this embodiment of this application.

In this embodiment of this application, the sixth field is added to the link information field, so that the non-AP MLD can clearly indicate whether the AP MLD probes a link (for example, the first link). In other words, the non-AP MLD may flexibly select a link as a probe request object, to avoid that the AP MLD probes the link (for example, the first link) again. This avoids resource waste.

With reference to the method described above, the following describes in detail the structure of the probe request frame provided in this embodiment of this application.

FIG. 8*a* is a schematic diagram of a structure of a probe request frame according to an embodiment of this application. A multi-link element shown in FIG. 8*a* may indicate a probing target. In other words, the multi-link element may be used only to request the link information of the AP MLD. The multi-link element in FIG. 1*a* needs to request the link information of the AP MLD, and also needs to indicate the link information of the non-AP MLD. Compared with that in FIG. 1*a*, the multi-link element shown in FIG. 8*a* may not indicate the link information of the non-AP MLD. In this case, the complete information (complete information) field in the multi-link element may not function to indicate whether information of the non-AP MLD on a corresponding link is complete, but is used to request the AP MLD to feed back complete information or partial information of the corresponding link. The corresponding link refers to a link corresponding to the link information field. For specific descriptions of the corresponding link, refer to the foregoing embodiment. Details are not described herein again.

Herein, to request the AP MLD to feed back complete information or partial information of the corresponding link may also be understood as: to request the AP MLD to make the complete information or the partial information of the corresponding link carried in the probe response frame, or the non-AP MLD requests the AP MLD to feed back the complete information or the partial information of the corresponding link, or the like.

According to the foregoing implementation, a complete information field is reused, so that signaling overheads can be reduced. In addition, the AP MLD clearly learns which one of the complete information and the partial information of the corresponding link is probed. This improves information exchange efficiency.

FIG. 8*b* is a schematic diagram of a structure of another probe request frame according to an embodiment of this application. Compared with the multi-link element shown in FIG. 8*a*, a multi-link control (multi-link control) field in a multi-link element shown in FIG. 8*b* further includes a type (type) field (namely, the third field described above). The type field may indicate a type of the multi-link element. The type of the multi-link element described herein includes to request the link information of the AP MLD. In other words, in this embodiment of this application, the type of the multi-link element may be only to indicate a probing target. The multi-link element shown in FIG. 8*a* is used as an example. The type field may indicate that the type of the multi-link element is to request the link information of the AP MLD. In this case, the multi-link element may not indicate the link information of the non-AP MLD.

It may be understood that for descriptions of other fields of the multi-link element shown in FIG. 8*b*, refer to the foregoing embodiment. Details are not described herein again.

FIG. 8*c* is a schematic diagram of a structure of still another probe request frame according to an embodiment of this application. As shown in FIG. 8*c*, the probe request frame may include two types of probe request frames. In other words, the probe request frame includes at least two multi-link elements. The at least two multi-link elements may include a first multi-link element and a second multi-link element. The first multi-link element and the second multi-link element are of different types. For example, the first multi-link element may indicate the link information that is requested by the non-AP MLD and that is fed back by the AP MLD. The second multi-link element may indicate the link information of the non-AP MLD.

It may be understood that in the probe request frame shown in FIG. 8c, as the foregoing descriptions of FIG. 5a, the one or more links corresponding to the first multi-link element may be completely the same as or completely different from the one or more links corresponding to the second multi-link element, or may be partially the same as the one or more links corresponding to the second multi-link element. Therefore, if the non-AP MLD has obtained link information of some links, the AP MLD does not need to probe these links again. In this case, the one or more links corresponding to the first multi-link element may not include these links. In this manner, the non-AP MLD may further flexibly select a link as a probe request object, to avoid that the AP MLD probes the foregoing some links again. This avoids resource waste. It may be understood that for specific descriptions of the probe request frame, refer to the descriptions in the foregoing method embodiments. Details are not described herein again.

Figure 8D:
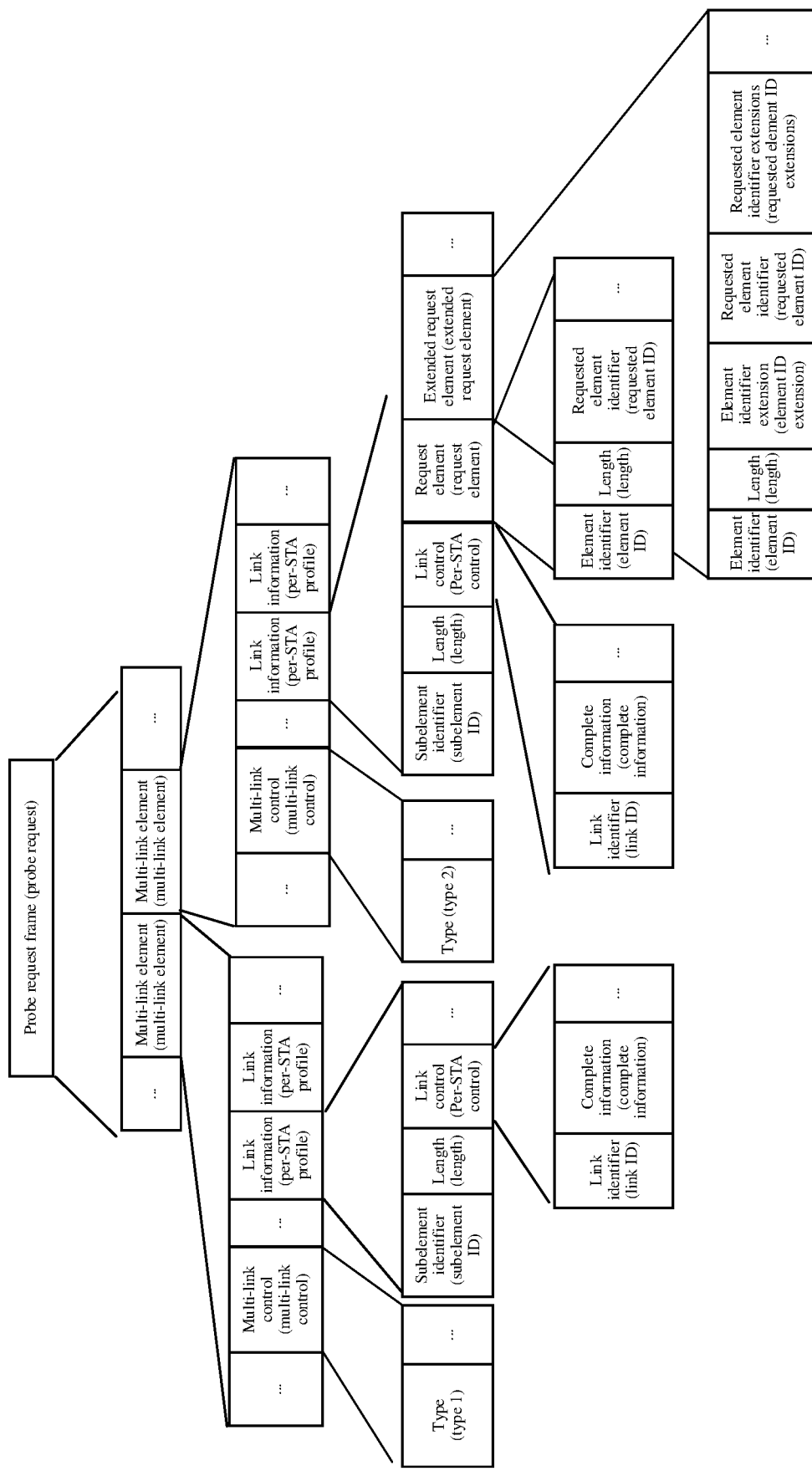

It may be understood that FIG. 8a to FIG. 8c do not show a request element and/or an extended request element. However, each link information field in FIG. 8a to FIG. 8c may further include a request element and/or an extended request element. In FIG. 8c, when a value of a type field in the multi-link element is a third value (for example, type 2 in FIG. 8c), and a value of a complete information field is a first value, the link information field is used to request complete information of a corresponding link. When a value of a type field of the multi-link element is a third value, and a value of a complete information field is a second value, the link information field is used to request partial information of a corresponding link. In this case, as shown in FIG. 8d, the link information field further needs to include a request element and/or an extended request element. As shown in FIG. 8d, a requested element identifier (requested element ID) in the request element may indicate a requested information element. A requested element identifier extensions (requested element ID extensions) in the extended request element may indicate the requested information element. The request element identifier and the request element identifier extensions described herein may be understood as the element ID of the information element of the partial information in FIG. 6b. It may be understood that FIG. 8c is merely used as an example herein. However, FIG. 8a and/or FIG. 8b may also include a request element and/or an extended request element. Details are not described herein again.

It may be understood that for specific descriptions of FIG. 8d, refer to FIG. 8a to FIG. 8c, and the like. Details are not described herein again.

The probe request frame provided in this embodiment of this application includes the type field, so that the non-AP MLD can more flexibly select the multi-link element, and the probe request frame carries the corresponding multi-link element.

Figure 8E:
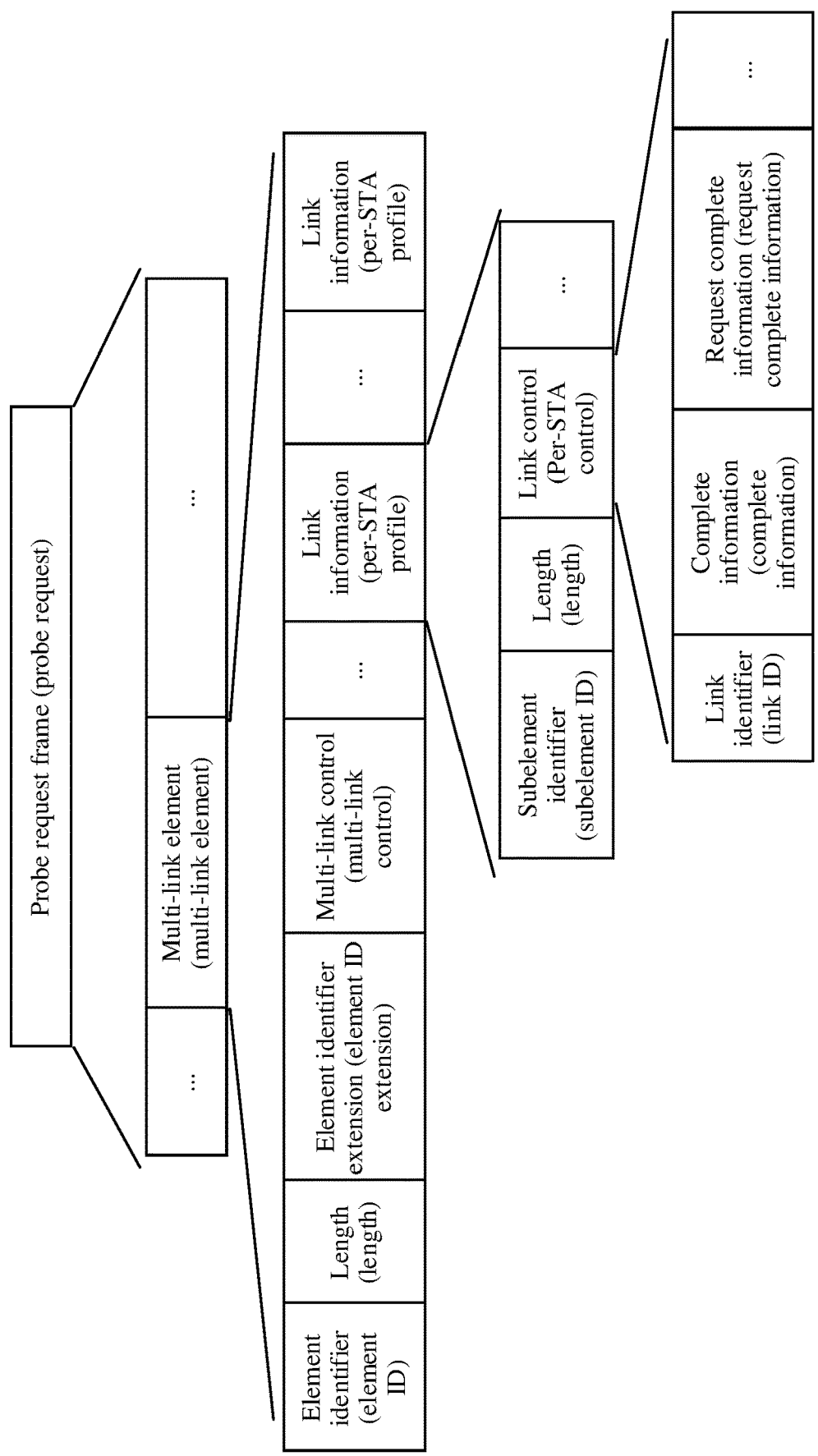

FIG. 8e is a schematic diagram of a structure of still another probe request frame according to an embodiment of this application. A multi-link element shown in FIG. 8e is used to request the link information of the AP MLD, and also indicates the link information of the non-AP MLD.

A complete information field in the multi-link element shown in FIG. 8e indicates whether information of the non-AP MLD on a corresponding link is complete, In other words, the complete information field indicates that the non-AP MLD carries complete information or partial information of the corresponding link. In addition, the multi-link element further includes a request complete information (request complete information) field. The request complete information field may be used to request the AP MLD to feed back the complete information or the partial information of the corresponding link.

In this embodiment of this application, the request complete information field is newly added to the multi-link element, so that the AP MLD can clearly learn of which one of the complete information and the partial information of the corresponding link is probed. This improves information exchange efficiency.

In a possible implementation, the probe request frame may have a structure described above. To be specific, the multi-link element is used to request the link information of the AP MLD, and also indicates the link information of the non-AP MLD.

In another possible implementation, the request complete information field shown in FIG. 8e may be further combined with the type field shown in FIG. 8a to FIG. 8d. The link control field shown in FIG. 8a may further include a request complete information field.

It may be understood that names of the foregoing fields, locations of the fields, or the like may change with standard promotion, technology evolution, or the like. This is not limited in this embodiment of this application.

It may be understood that, in the foregoing described embodiments, for an implementation that is not described in detail in one embodiment, refer to descriptions in another embodiment. Details are not described herein again.

The following describes in detail communication apparatuses provided in embodiments of this application.

In this application, functional modules of the AP MLD and the non-AP MLD may be obtained through division according to the foregoing method embodiments. For example, the functional modules may be obtained through division corresponding to various functions, or two or more functions may be integrated into one processing module. The integrated module may be implemented in a form of hardware, or may be implemented in a form of a software functional module. It should be noted that, in this application, module division is an example, and is merely a logical function division. During actual implementation, another division manner may be used. The following describes in detail communication apparatuses in embodiments of this application with reference to FIG. 9 to FIG. 11. The communication apparatus is an access point or a station, or the communication apparatus may be an apparatus in the AP MLD, or the communication apparatus is an apparatus in the non-AP MLD.

Figure 9:
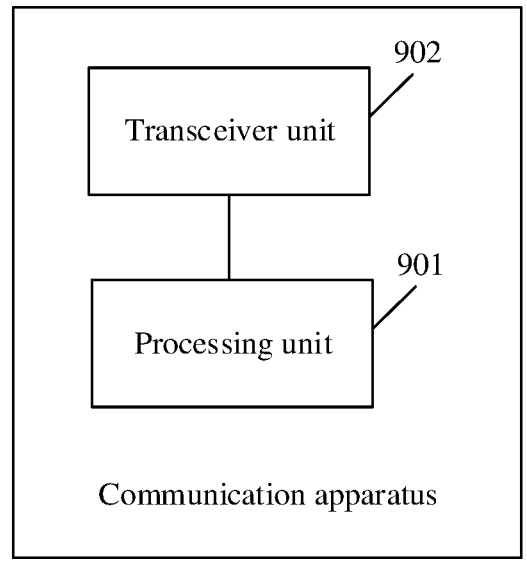
FIG. 9 to FIG. 11 each shows a schematic diagram of a structure of a communication apparatus according to an embodiment of this application.

FIG. 9 is a schematic diagram of a structure of a communication apparatus according to an embodiment of this application. As shown in FIG. 9, the communication apparatus includes a processing unit 901 and a transceiver unit 902.

In some embodiments of this application, the communication apparatus may be the non-AP MLD or the chip in the non-AP MLD described above, for example, the Wi-Fi chip.

For example, the processing unit 901 is configured to generate a probe request frame. The transceiver unit 902 is configured to output the probe request frame.

In this embodiment of this application, that the transceiver unit outputs the probe request frame includes: The transceiver unit sends the probe request frame to an AP MLD.

In this embodiment of this application, for descriptions of the probe request frame and a probe response frame, refer to the foregoing method embodiments. For example, for descriptions of the probe request frame, refer to descriptions of FIG. 5a and/or FIG. 5b. For another example, for descriptions of the probe request frame, refer to descriptions of FIG. 6a and/or FIG. 6b. For another example, for descriptions of the probe request frame, refer to descriptions of FIG. 7a. For a specific structure of the probe request frame, refer to the schematic diagrams of the structures shown in FIG. 8a to FIG. 8e, or refer to the schematic diagram of the structure shown in FIG. 7b.

It may be understood that for specific descriptions of the transceiver unit and the processing unit described above, refer to the steps performed by the non-AP MLD in the foregoing method embodiments.

In a possible implementation, the processing unit may be configured to perform step 501 in FIG. 5a, and the transceiver unit may be configured to perform the sending step in step 502 and the receiving step in step 504 in FIG. 5a.

In a possible implementation, the processing unit may be configured to perform step 511 in FIG. 5b, and the transceiver unit may be configured to perform the sending step in step 512 and the receiving step in step 514 in FIG. 5b.

In a possible implementation, the processing unit may be configured to perform step 601 in FIG. 6a, and the transceiver unit may be configured to perform the sending step in step 602 and the receiving step in step 604 in FIG. 6a.

In a possible implementation, the processing unit may be configured to perform step 611 in FIG. 6b, and the transceiver unit may be configured to perform the sending step in step 612 and the receiving step in step 614 in FIG. 6b.

In a possible implementation, the processing unit may be configured to perform step 701 in FIG. 7a, and the transceiver unit may be configured to perform the sending step in step 702 and the receiving step in step 702 in FIG. 7a.

It may be understood that specific descriptions of the transceiver unit and the processing unit described in this embodiment of this application are merely examples. For specific functions, steps, or the like of the transceiver unit and the processing unit, refer to the foregoing method embodiments. Details are not described herein again.

In some other embodiments of this application, the communication apparatus may be the AP MLD or the chip in the AP MLD described above, for example, the Wi-Fi chip.

For example, the transceiver unit 902 is configured to input a probe request frame. The processing unit 901 is configured to generate a probe response frame based on the probe request frame. The transceiver unit 902 is further configured to output the probe response frame.

In this embodiment of this application, that the transceiver unit inputs the probe request frame includes: The transceiver unit receives the probe request frame from a non-AP MLD. That the transceiver unit outputs the probe response frame includes: The transceiver unit sends the probe response frame to the non-AP MLD.

It may be understood that for specific descriptions of the transceiver unit and the processing unit described above, refer to the steps performed by the non-AP MLD in the foregoing method embodiments.

In a possible implementation, the transceiver unit may be configured to perform the receiving step in step 502 in FIG. 5a, the processing unit may be configured to perform step 503 in FIG. 5a, and the transceiver unit may be further configured to perform the sending step in step 504 in FIG. 5a.

In a possible implementation, the transceiver unit may be configured to perform the receiving step in step 512 in FIG. 5b, the processing unit may be configured to perform step 513 in FIG. 5b, and the transceiver unit may be further configured to perform the sending step in step 514 in FIG. 5b.

In a possible implementation, the transceiver unit may be configured to perform the receiving step in step 602 in FIG. 6a, the processing unit may be configured to perform step 603 in FIG. 6a, and the transceiver unit may be further configured to perform the sending step in step 604 in FIG. 6a.

In a possible implementation, the transceiver unit may be configured to perform the receiving step in step 612 in FIG. 6b, the processing unit may be configured to perform step 613 in FIG. 6b, and the transceiver unit may be further configured to perform the sending step in step 614 in FIG. 6b.

In a possible implementation, the transceiver unit may be configured to perform the receiving step in step 702 in FIG. 7a, the processing unit may be configured to perform step 703 in FIG. 7a, and the transceiver unit may be further configured to perform the sending step in step 704 in FIG. 7a.

It may be understood that specific descriptions of the transceiver unit and the processing unit described in this embodiment of this application are merely examples. For specific functions, steps, or the like of the transceiver unit and the processing unit, refer to the foregoing method embodiments. Details are not described herein again.

It may be understood that when the communication apparatus is a non-AP MLD, the processing unit is further configured to generate an association request frame, and the transceiver unit may be further configured to output the association request frame. Alternatively, the transceiver unit may be further configured to input any one or more of an association response frame, a probe response frame, a beacon frame, or the like, and the processing unit may be further configured to process the association response frame, the probe response frame, the beacon frame, or the like. Correspondingly, when the communication apparatus is an AP MLD, the transceiver unit may be further configured to input an association request frame, and the processing unit may be further configured to process the association request frame. Alternatively, the processing unit may be further configured to generate an association response frame, a probe response frame, a beacon frame, or the like, and the transceiver unit may be further configured to output the association response frame, the probe response frame, the beacon frame, or the like.

The foregoing describes the AP MLD and the non-AP MLD in this embodiment of this application. The following describes possible product forms of the AP MLD and the non-AP MLD. It should be understood that any product in any form that has the function of the non-AP MLD described in FIG. 9 and any product in any form that has the function of the AP MLD described in FIG. 9 fall within the protection scope of embodiments of this application. It should be further understood that the following description is merely an example, and product forms of the AP MLD and the non-AP MLD in embodiments of this application are not limited thereto.

In a possible implementation, in the communication apparatus shown in FIG. 9, the processing unit 901 may be one or more processors. The transceiver unit 902 may be a transceiver, or the transceiver unit 902 may be a sending unit and a receiving unit. The sending unit may be a transmitter, and the receiving unit may be a receiver. The sending unit and the receiving unit are integrated into one component, for example, a transceiver. In this embodiment of this application, the processor and the transceiver may be coupled, or the like. A connection manner between the processor and the transceiver is not limited in this embodiment of this application.

Figure 10:
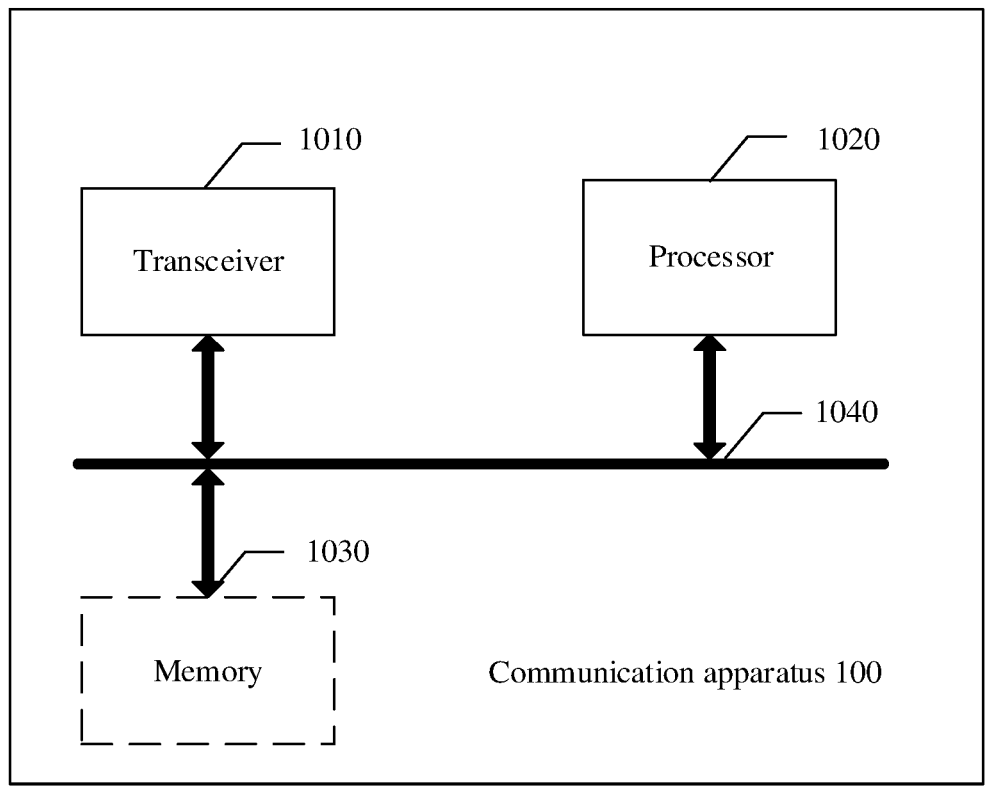

As shown in FIG. 10, the communication apparatus 100 includes one or more processors 1020 and a transceiver 1010.

For ease of description, FIG. 10 shows only main components of the communication apparatus. In addition to the processor 1020 and the transceiver 1010, the communication apparatus may further include a memory 1030 and an input/output apparatus (not shown in the figure).

The processor 1020 is mainly configured to process a communication protocol and communication data, control the communication apparatus, execute a software program, and process data of the software program. The memory 1030 is mainly configured to store the software program and the data. The transceiver 1010 may include a control circuit and an antenna. The control circuit is mainly configured to perform conversion between a baseband signal and a radio frequency signal and process the radio frequency signal. The antenna is mainly configured to receive and send a radio frequency signal in a form of electromagnetic wave. The input/output apparatus, such as a touchscreen, a display, or a keyboard, is mainly configured to receive data input by a user and output data to the user.

After the communication apparatus is powered on, the processor 1020 may read the software program in the memory 1030, interpret and execute instructions of the software program, and process the data of the software program. When data needs to be sent wirelessly, the processor 1020 performs baseband processing on the to-be-sent data, and then outputs a baseband signal to a radio frequency circuit. The radio frequency circuit performs radio frequency processing on the baseband signal, and then sends a radio frequency signal in a form of electromagnetic wave through the antenna. When data is sent to the communication apparatus, the radio frequency circuit receives a radio frequency signal through the antenna, converts the radio frequency signal into a baseband signal, and outputs the baseband signal to the processor 1020. The processor 1020 converts the baseband signal into data, and processes the data.

In another implementation, the radio frequency circuit and the antenna may be disposed independent of the processor that performs baseband processing. For example, in a distributed scenario, the radio frequency circuit and the antenna may be separately disposed independent of the communication apparatus.

In some embodiments of this application, the processor and the transceiver may be configured to perform a function, an operation, or the like performed by the foregoing non-AP MLD.

For example, the processor 1020 is configured to generate a probe request frame. The transceiver 1010 is configured to send the probe request frame to the AP MLD.

In some other embodiments of this application, the processor 1020 and the transceiver 1010 may be configured to perform a function, an operation, or the like performed by the foregoing AP MLD.

For example, the transceiver 1010 is configured to receive a probe request frame from the non-AP MLD. The processor 1020 is configured to generate a probe response frame based on the probe request frame. The transceiver 1010 is further configured to send the probe response frame to the non-AP MLD.

It may be understood that for specific descriptions of the processor and the transceiver, refer to descriptions of the processing unit and the transceiver unit shown in FIG. 9. Details are not described herein again.

In each implementation of the communication apparatus shown in FIG. 10, the transceiver may include a receiver and a transmitter. The receiver is configured to perform a receiving function (or operation), and the transmitter is configured to perform a transmitting function (or operation). The transceiver is configured to communicate with another device/apparatus through a transmission medium.

Optionally, the communication apparatus 100 may further include one or more memories 1030, configured to store program instructions and/or data. The memory 1030 is coupled to the processor 1020. The coupling in this embodiment of this application may be an indirect coupling or a communication connection between apparatuses, units, or modules in an electrical form, a mechanical form, or another form, and is used for information exchange between the apparatuses, the units, or the modules. The processor 1020 may cooperate with the memory 1030. The processor 1020 may execute the program instructions stored in the memory 1030. Optionally, at least one of the one or more memories may be included in the processor.

In this embodiment of this application, a specific connection medium between the transceiver 1010, the processor 1020, and the memory 1030 is not limited. In this embodiment of this application, the memory 1030, the processor 1020, and the transceiver 1010 are connected by using a bus 1040 in FIG. 10. The bus is represented by using a bold line in FIG. 10. The foregoing is merely an example for description. A connection manner of other components is not limited thereto. The bus may be classified into an address bus, a data bus, a control bus, and the like. For ease of representation, only one thick line is used to represent the bus in FIG. 10, but this does not mean that there is only one bus or only one type of bus.

In embodiments of this application, the processor may be a general-purpose processor, a digital signal processor, an application-specific integrated circuit, a field programmable gate array or another programmable logic device, a discrete gate or a transistor logic device, a discrete hardware component, or the like, and may implement or perform the methods, steps, and logical block diagrams disclosed in embodiments of this application. The general purpose processor may be a microprocessor or any conventional processor or the like. The steps of the method disclosed with reference to embodiments of this application may be directly performed by a hardware processor, or may be performed by using a combination of hardware in the processor and a software module, or the like.

In this embodiment of this application, the memory may include but is not limited to a non-volatile memory such as a hard disk drive (hard disk drive, HDD) or a solid-state drive (solid-state drive, SSD), a random access memory (Random Access Memory, RAM), an erasable programmable read-only memory (Erasable Programmable ROM, EPROM), a read-only memory (Read-Only Memory, ROM), a compact disc read-only memory (Compact Disc Read-Only Memory, CD-ROM), or the like. The memory is any storage medium that can be configured to carry or store program code in an instruction or data structural form and that can be read and/or written by a computer (for example, the communication apparatus described in this application), but is not limited thereto. The memory in this embodiment of this application may alternatively be a circuit or any other apparatus that can implement a storage function, and is configured to store the program instructions and/or the data.

It may be understood that the communication apparatus described in this embodiment of this application may further have more components than those in FIG. 10, and the like. This is not limited in this embodiment of this application. It may be understood that the method performed by the processor and the transceiver described above is merely an example. For specific steps performed by the processor and the transceiver, refer to the method described above.

Figure 11:
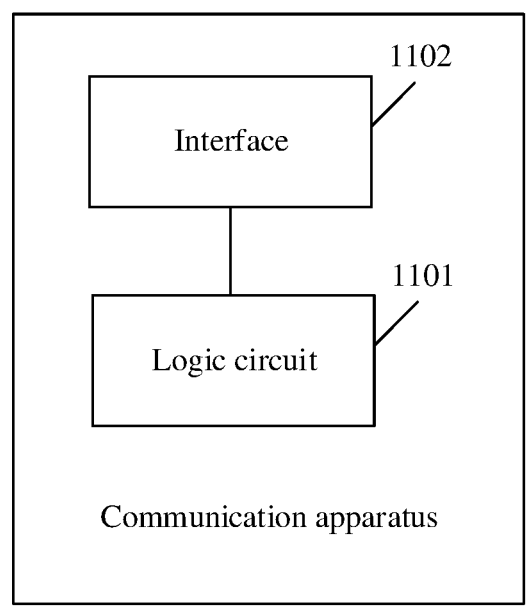

In another possible implementation, in the communication apparatus shown in FIG. 9, the processing unit 901 may be one or more logic circuits. The transceiver unit 902 may be an input/output interface that is also referred to as a communication interface, an interface circuit, an interface, or the like. Alternatively, the transceiver unit 902 may be a sending unit and a receiving unit. The sending unit may be an output interface, and the receiving unit may be an input interface. The sending unit and the receiving unit are integrated into one unit, for example, an input/output interface. As shown in FIG. 11, the communication apparatus shown in FIG. 11 includes a logic circuit 1101 and an interface 1102. In other words, the processing unit 901 may be implemented by using the logic circuit 1101, and the transceiver unit 902 may be implemented by using the interface 1102. The logic circuit 1101 may be a chip, a processing circuit, an integrated circuit, a system on chip (system on chip, SoC), or the like. The interface 1102 may be a communication interface, an input/output interface, or the like. In this embodiment of this application, the logic circuit and the interface may be further coupled to each other. A specific connection manner of the logic circuit and the interface is not limited in this embodiment of this application.

In some embodiments of this application, the logic circuit and the interface may be configured to perform functions, steps, or the like performed by the foregoing non-AP MLD. For example, the logic circuit is configured to generate a probe request frame. The interface is configured to output the probe request frame.

In some other embodiments of this application, the logic circuit and the interface may be configured to perform functions, steps, or the like performed by the foregoing AP MLD. For example, the interface is configured to input a probe request frame. The logic circuit is configured to generate a probe response frame based on the probe request frame. The interface is further configured to output the probe response frame.

For specific implementations of embodiments shown in FIG. 11, refer to the foregoing embodiments. Details are not described herein again.

It may be understood that in the apparatus embodiment described above, for descriptions of the probe request frame and the probe response frame, refer to the foregoing method embodiments. For example, for descriptions of the probe request frame, refer to descriptions of FIG. 5a and/or FIG. 5b. For another example, for descriptions of the probe request frame, refer to descriptions of FIG. 6a and/or FIG. 6b. For another example, for descriptions of the probe request frame, refer to descriptions of FIG. 7a. For a specific structure of the probe request frame, refer to the schematic diagrams of the structures shown in FIG. 8a to FIG. 8e, or refer to the schematic diagram of the structure shown in FIG. 7b. Details are not described herein again.

An embodiment of this application further provides a multi-link communication system. The multi-link communication system includes a non-AP MLD and an AP MLD. The non-AP MLD and the AP MLD may be configured to perform the method in any one of the foregoing embodiments.

Alternatively, for specific implementations of the non-AP MLD and the AP MLD, refer to the communication apparatuses shown in FIG. 9 to FIG. 11. Details are not described herein again.

In addition, this application further provides a computer program. The computer program is configured to implement an operation and/or processing performed by the non-AP MLD in the method provided in this application.

This application further provides a computer program. The computer program is configured to implement an operation and/or processing performed by the AP MLD in the method provided in this application.

This application further provides a computer-readable storage medium. The computer-readable storage medium stores computer code. When the computer code is run on a computer, the computer is enabled to perform an operation and/or processing performed by the non-AP MLD in the method provided in this application.

This application further provides a computer-readable storage medium. The computer-readable medium stores computer code. When the computer code is run on a computer, the computer is enabled to perform an operation and/or processing performed by the AP MLD in the method provided in this application.

This application further provides a computer program product. The computer program product includes computer code or a computer program. When the computer code or the computer program is run on a computer, an operation and/or processing performed by the non-AP MLD in the method provided in this application are/is implemented.

This application further provides a computer program product. The computer program product includes computer code or a computer program. When the computer code or the computer program is run on a computer, an operation and/or processing performed by the AP MLD in the method provided in this application are/is implemented.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one location, or may be distributed on a plurality of network units. Some or all of the units may be selected based on actual requirements to achieve technical effects of the solutions provided in embodiments of this application.

In addition, function units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions in this application essentially, or the part contributing to a conventional technology, or all or a part of the technical solutions may be implemented in a form of a software product. The computer software product is stored in a readable storage medium and includes several instructions for instructing a computer device (which may be a personal computer, a server, a network device, or the like) to perform all or a part of the steps of the methods in embodiments of this application. The foregoing readable storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A multi-link communication probe request method implemented by a communication apparatus, comprising:
generating a probe request frame, wherein the probe request frame comprises a first multi-link element, the first multi-link element is used to request link information of an access point multi-link device (AP MLD), the first multi-link element comprises a first link information field, the first link information field comprises a first field, the first field indicates that a non-access point multi-link device (non-AP MLD) requests the AP MLD to feed back complete information or partial information of a first link, and the first link information field corresponds to the first link, and the probe request frame further carries an information element outside the first multi-link element,
wherein when the first link information field of the first multi-link element in the probe request frame does not carry a request element and an extended request element, the non-AP MLD requests to the AP MLD to feed back the complete information of the first link, and
wherein when an element ID of an information element of the partial information is indicated by at least one of the request elements and the extended request element carried in the first link information field of the first multi-link element, the non-AP MLD requests to probe the partial information of the first link, and the partial information of the first link does not inherit from the information element carried in the probe request frame outside the first multi-link element; and
sending, the probe request frame to the AP MLD.

2. The method according to claim 1, wherein the first field is a complete information field in the first link information field.

3. The method according to claim 1, wherein the first multi-link element further comprises a first multi-link control field, the first multi-link control field comprises first type information, and the first type information indicates a type of the first multi-link element.

4. The method according to claim 1, wherein the probe request frame further comprises a second multi-link element, and the second multi-link element indicates link information of the non-AP MLD.

5. The method according to claim 4, wherein the second multi-link element comprises a second link information field, the second link information field comprises a second field, the second field indicates that the non-AP MLD carries complete information or partial information of the second link, and the second link information field corresponds to the second link.

6. The method according to claim 5, wherein the second field is a complete information field in the second link information field.

7. The method according to claim 4, wherein the second multi-link element further comprises a second multi-link control field, the second multi-link control field comprises second type information, and the second type information indicates a type of the second multi-link element.

8. The method according to claim 1, wherein the first field is a request complete information field in the first link information field.

9. A communication apparatus, comprising:
at least one processor; and
at least one memory coupled to the at least one processor and storing programming instructions for execution by the at least one processor and causing the communications apparatus to:
generate a probe request frame, wherein the probe request frame comprises a first multi-link element, the first multi-link element is used to request link information of an access point multi-link device (AP MLD), the first multi-link element comprises a first link information field, the first link information field comprises a first field, the first field indicates that the communication apparatus requests the AP MLD to feed back complete information or partial information of a first link, and the first link information field corresponds to the first link, and the probe request frame further carries an information element outside the first multi-link element,
wherein when the first link information field of the first multi-link element in the probe request frame does not carry a request element and an extended request element, the non-AP MLD requests to the AP MLD to feed back the complete information of the first link, and
wherein when an element ID of an information element of the partial information is indicated by at least one of the request elements and the extended request element carried in the first link information field of the first multi-link element, the non-AP MLD requests to probe the partial information of the first link, and the partial information of the first link does not inherit from the information element carried in the probe request frame outside the first multi-link element; and
output the probe request frame.

10. The communication apparatus according to claim 9, wherein the communication apparatus is a non-access point multi-link device (non-AP MLD).

11. The communication apparatus according to claim 9, wherein the first field is a complete information field in the first link information field.

12. The communication apparatus according to claim 9, wherein the first multi-link element further comprises a first multi-link control field, the first multi-link control field comprises first type information, and the first type information indicates a type of the first multi-link element.

13. The communication apparatus according to claim 9, wherein the probe request frame further comprises a second multi-link element, and the second multi-link element indicates link information of the non-AP MLD.

14. The communication apparatus according to claim 13, wherein the second multi-link element comprises a second link information field, the second link information field comprises a second field, the second field indicates that the non-AP MLD carries complete information or partial information of the second link, and the second link information field corresponds to the second link.

15. The communication apparatus according to claim 14, wherein the second field is a complete information field in the second link information field.

16. The communication apparatus according to claim 13, wherein the second multi-link element further comprises a second multi-link control field, the second multi-link control field comprises second type information, and the second type information indicates a type of the second multi-link element.

17. The communication apparatus according to claim 9, wherein the first field is a request complete information field in the first link information field.

18. A chip, comprising:
a memory;
a processor coupled to the memory, and configured to generate a probe request frame, wherein the probe request frame comprises a first multi-link element, the first multi-link element is used to request link information of an access point multi-link device (AP MLD), the first multi-link element comprises a first link information field, the first link information field comprises a first field, the first field indicates that the communication apparatus requests the AP MLD to feed back complete information or partial information of a first link, and the first link information field corresponds to the first link, wherein when the first link information field of the first multi-link element in the probe request frame does not carry the request element and the extended request element, the non-AP MLD requests to the AP MLD to feed back the complete information of the first link, and the probe request frame further carries an information element outside the first multi-link element, wherein when an element ID of an information element of the partial information is indicated by at least one of the request elements and the extended request element carried in the first link information field of the first multi-link element; the non-AP MLD requests to probe the partial information of the first link; and the partial information of the first link does not inherit from the information element carried in the probe request frame outside the first multi-link element; and output the probe request frame.

19. The method according to claim 1, wherein a type of the first multi-link element is a basic type or the type of the multi-link element is an MLD probing type.

20. The communication apparatus according to claim 9, wherein a type of the first multi-link element is a basic type or the type of the multi-link element is an MLD probing type.

21. The method according to claim 1, wherein when a value of the first field is a first value, the first field indicates that the non-AP MLD requests the AP MLD to feed back the complete information of the first link; or when a value of the first field is a second value, the first field indicates that the non-AP MLD requests the AP MLD to feed back the partial information of the first link.

22. The method according to claim 9, wherein when a value of the first field is a first value, the first field indicates that the non-AP MLD requests the AP MLD to feed back the complete information of the first link; or when a value of the first field is a second value, the first field indicates that the non-AP MLD requests the AP MLD to feed back the partial information of the first link.

* * * * *